US012417677B2

(12) United States Patent
Colvin et al.

(10) Patent No.: US 12,417,677 B2

(45) Date of Patent: Sep. 16, 2025

(54) SYSTEMS AND METHODS FOR OFFERING A PLURALITY OF ELECTRONIC TABLE GAMES OF CHANCE ON AN ELECTRONIC GAMING MACHINE INCLUDING SIDE BETS TO INCREASE HOLD

(71) Applicant: Gaming Arts, LLC, Las Vegas, NV (US)

(72) Inventors: David Colvin, Las Vegas, NV (US); William Chong, Las Vegas, NV (US); Keith Matthew Kruczynski, Henderson, NV (US); Joel Jason Searles, Las Vegas, NV (US); Randall Paul Tallon, Las Vegas, NV (US)

( * ) Notice: Subject to any disclaimer, the term of this patent is extended or adjusted under 35 U.S.C. 154(b) by 0 days.

(21) Appl. No.: 18/190,821

(22) Filed: Mar. 27, 2023

(65) Prior Publication Data

US 2024/0071180 A1 Feb. 29, 2024

Related U.S. Application Data

(63) Continuation of application No. 16/934,956, filed on Jul. 21, 2020, now Pat. No. 11,615,678.

(51) Int. Cl.
*G07F 17/32* (2006.01)

(52) U.S. Cl.
CPC ...... *G07F 17/3293* (2013.01); *G07F 17/3209* (2013.01); *G07F 17/3211* (2013.01); *G07F 17/3248* (2013.01); *G07F 17/3251* (2013.01)

(58) Field of Classification Search
CPC ............. G07F 17/3293; G07F 17/3209; G07F 17/3211; G07F 17/3248; G07F 17/3251
USPC ............................................................. 463/13
See application file for complete search history.

(56) References Cited

U.S. PATENT DOCUMENTS

| | | | | |
|---|---|---|---|---|
| 8,182,321 B2 * | 5/2012 | Chun | G07F 17/3227 463/28 |
| 9,704,348 B2 * | 7/2017 | Chun | G07F 17/3244 |
| 10,438,450 B2 * | 10/2019 | Nelson | G07F 17/3244 |
| 10,561,928 B2 * | 2/2020 | Nelson | G07F 17/3258 |
| 2008/0254881 A1 * | 10/2008 | Lutnick | G07F 17/3293 463/31 |
| 2019/0099660 A1 * | 4/2019 | Nelson | A63F 3/00157 |

* cited by examiner

*Primary Examiner* — Allen Chan
(74) *Attorney, Agent, or Firm* — FisherBroyles, LLP; Rob L. Phillips

(57) ABSTRACT

A system and method for operating a plurality of games of chance. The gaming system includes a primary game display area and a secondary game display area. The plurality of games includes at least a plurality of electronic table games including two or more electronic table games from a group of table games including, craps, baccarat, roulette, blackjack, three-card poker, pai gow poker, Caribbean stud and big 6 wheel. The processing of the two or more electronic table games includes a separate and discrete game state engine for each of the two or more electronic table games. High hold percentage side bets are offered to increase the hold percentage of at least one table game and the overall hold percentage of the gaming system.

96 Claims, 21 Drawing Sheets

SYSTEMS AND METHODS FOR OFFERING A PLURALITY OF ELECTRONIC TABLE GAMES OF CHANCE ON AN ELECTRONIC GAMING MACHINE INCLUDING SIDE BETS TO INCREASE HOLD

CROSS-REFERENCES

This application is a continuation of, and claims priority to, U.S. patent application Ser. No. 16/934,956 filed on Jul. 21, 2020 and which is incorporated herein for all purposes.

FIELD OF THE INVENTION

The embodiments of the present invention relate to systems and methods for offering a plurality of table games of chance including side wagers on an electronic gaming machine while offering configurability options to more closely emulate actual table games utilizing multiple discrete game engines with separate game states and code paths including code loops.

BACKGROUND

Casinos derive much of their gaming revenue from electronic gaming machines ("EGMs") such as slot machines. Unfortunately, even with the introduction of new technology (e.g., curved displays), slot machines and the like can become stale after even short game play sessions. Moreover, younger players do not tend to play traditional slot machines because they are not exciting or attractive to play. Often such players find casino table games more exciting than traditional slot machines. Therefore, as the player demographic continues to trend younger, new and exciting electronic table games of chance are needed.

Many conventional casino table games exist with many being staples of most casinos. These primary table games include craps, roulette, blackjack, and baccarat with many other proprietary or secondary table games such as Pai Gow Poker, Three Card Poker, Caribbean Stud, etc., to offer players a wide range of game choices. While casino table games include a house advantage, the advantage is generally far less than the hold percentages of slot machines. For instance, a knowledgeable craps player can reduce the house advantage to less than 1% by utilizing the proper strategy of pass or come line bets with odds. Similarly, experienced players of blackjack, also known as 21, can often reduce the house percentage to under 1% using skilled play. Other table games such as roulette and baccarat have fixed house percentages of 5.26% for double zero roulette and 1.06% and 1.24% for baccarat, depending on wagering on the player or banker. These house percentages are far less than the average RTP which most EGMs are set at, usually ranging between 94% and 86% meaning the corresponding house advantage is 6% to 14%. Some table games offer a variety of bets which help offset these low house advantages. For instance, many craps wagers outside of pass and come line wagers, can have house advantages ranging between just over 1% to over 16% which can offset the low hold percentages of pass and come line bets. To offset the low house advantages in other table games such as blackjack and baccarat, side bets have been developed with hold percentages approaching 15% which when taken with standard wagers can significantly increase the house advantage.

The need for casinos to set RTP of EGMs at a low rate is dependent on total coin-in per day (total amount wagered) and cost of the EGMs which can approach or even exceed $20,000 per machine. Accordingly, if table games are produced in an electronic form, it is advantageous to increase hold percentages so they approach the RTP of traditional EGMs. Although some table games have been converted to EGMs, such as roulette and blackjack, it is often very difficult to have comparable win per unit (WPU) with traditional EGMs due to limited play and low hold percentages.

Accordingly, the new system and method detailed herein involve producing electronic versions of table games that reside on a common multi-game platform to achieve the volume of play necessary to warrant the cost of the electronic table game (ETG) and to produce comparable RTP percentages. Creative side bets with higher hold percentages assist in this effort. Moreover, most casino pits (the area of a casino which typically houses and operates table games) may have restricted play due to health concerns such as the COVID-19 pandemic of 2020. This restricted play, known as social distancing, may eliminate half or more of the gaming positions in the casino pit thereby often giving table games players little or no options if their desired table game is full. The embodiments of the present invention described herein provide options in such environments while increasing the hold and offering a multitude of table game options. To further emulate the table games in the pit, the embodiments of the present invention also provide configuration options allowing casino operators to configure the ETG similar to the wager limits and rules of the table games offered in their pit.

SUMMARY

The embodiments of the present invention relate to systems and methods for offering a plurality of table games of chance including side wagers on an electronic gaming machine while offering configurability options to more closely emulate table games in a casino pit.

In one embodiment, each table game has a dedicated game engine for controlling play of the selected table game.

Other variations, embodiments and features of the present invention will become evident from the following detailed description, drawings and claims.

DETAILED DESCRIPTION

Figure 1:
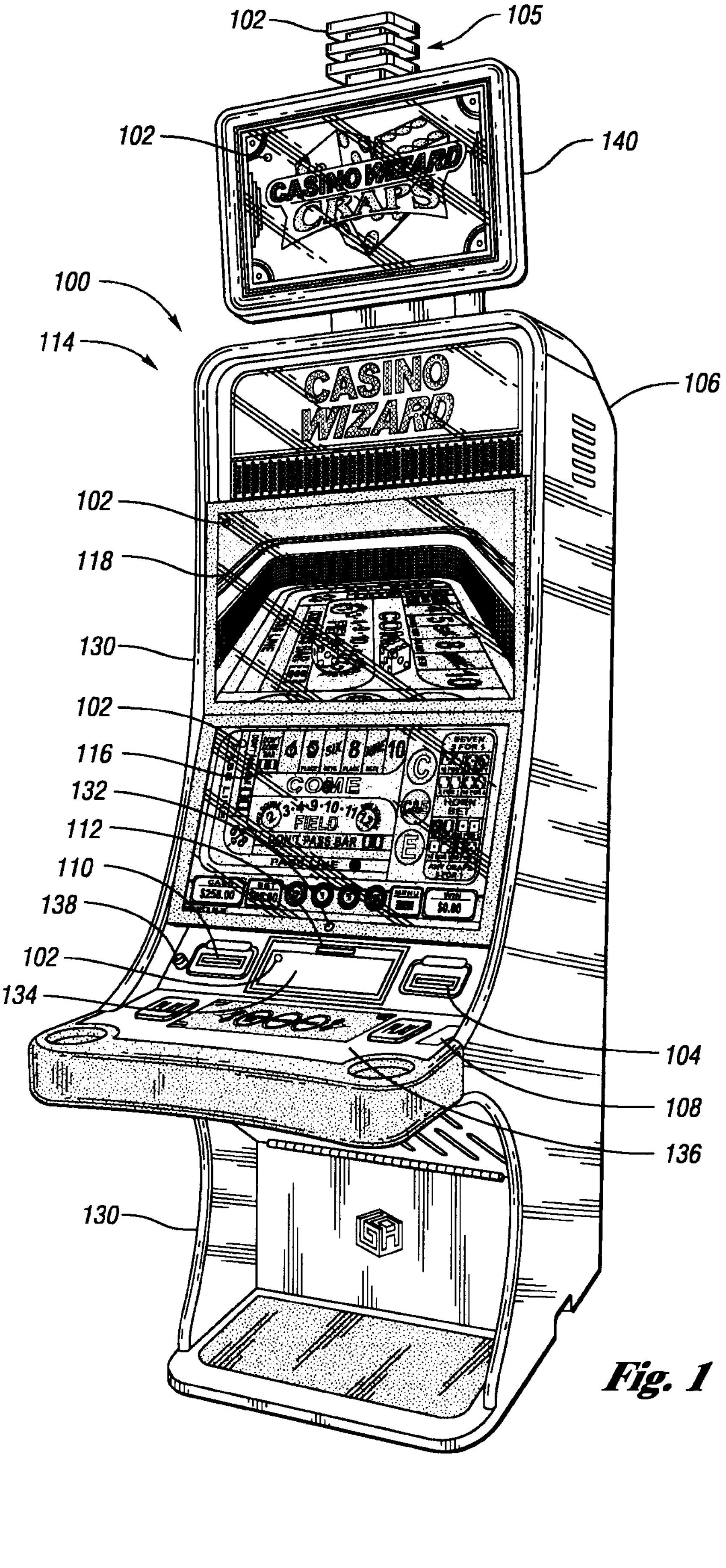
FIG. 1 illustrates an exemplary gaming machine of the type that may be used to facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements, which portions are described below in such detail required to construct and operate a game method and system according to the embodiments of the present invention.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wired, wireless, wireline, optical fiber cable, RF, Bluetooth and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

Those skilled in the art will recognize that certain types of EGMs, generally utilized in regulated casino environments, are still commonly referred to as "slot machines". Although the etymology of the term "slot machine" was originally derived from a coin slot in the gaming machines at the time, coin slots have long since generally been replaced by payment input devices or bill acceptors, also known as bill validators, which only accept paper currency or ticket-in-ticket-out vouchers and/or electronic fund transfer means, such as card readers, mobile device payment means or account interfaces. As a result, the term EGM and slot machine are used interchangeably and are defined to mean something different than a laptop or desktop computer, cell phones, tablet computer gaming devices and the like.

EGMs may be classified as Class II, Class III, video lottery terminals (VLT), or the like. EGMs may present either one or a plurality of games to the player such as video reels, video poker, video keno, video bingo, and the like. In another embodiment, the gaming devices are gaming kiosks or terminals. Alternatively, the gaming devices may include remote gaming devices, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a game of bingo to be played on a gaming device, the gaming device uses the randomization device to select a plurality of house indicia from a pool of indicia to be used during the game. In another embodiment, at least some aspects of the game are provided by one or more servers. The server or servers may include a randomization device for randomly selecting the house indicia in the bingo game or any other wagering event.

In the example of a video poker game, either one or a plurality of poker games are presented to the player. After game selection and wagering, a number of playing cards, generally selected from a 52-card deck, are distributed to the player. In the case of draw poker or its many variants, the player selectively chooses to retain one or more of the original cards dealt and to discard those cards not chosen to be retained. The discarded cards are then replaced by new cards. If the player obtains a predefined winning combination of cards, the player wins an amount associated with the particular winning combination of cards.

In the example of mechanical, electromechanical, or video reel machines, the games may include a number of mechanical or simulated rotating reels that are arranged in a horizontal configuration forming columns or vertical configurations forming rows. Alternatively, simulated rotating reels may be arranged in a vertical configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

In the example of the bingo game, the house indicia are compared to a plurality of player indicia that are included within a pattern selected for one or more player cards. If at least some of the player indicia within the pattern are matched by the house indicia, the player may win a prize based on the number of house indicia that have been matched and an associated pay table.

In the example of a keno game or a keno-related game of chance, the gaming device uses the randomization device to randomly select a plurality of house indicia in a similar manner as described with respect to the game of bingo. However, twenty house indicia are typically randomly selected or called from a pool of 80 house indicia, although other sizes of house indicia pools may be used. The called house indicia are compared to a plurality of player indicia to determine how many player indicia are matched by the house indicia and may be irrespective of a pattern of the player indicia. The embodiments described herein may include allowing the player to select the number of and specific player indicia to be utilized for a keno game or may include an automated or quick pick selection. For example, a player may select one player indicia or spot to play a 1 spot game, 2 player indicia or spots for a 2-spot game, 3 player indicia or spots for a 3-spot game, etc. Embodiments may also require a minimum number of player indicia or spots to match to win a game. For example, 10 player indicia or 10-spot game may require a minimum of 5 player indicia or spots to match the randomly selected player indicia. Embodiments may also include a maximum number of player indicia or spots that are playable. For example, in an 80-number game, the maximum number of house indicia or spots selectable by the player may be confined to 20 numbers or less or a 20-number game or less. Accordingly, in an 80-number game, the minimum number of player indicia or spots may be 2 and the maximum player indicia or spots may be 20. The player may win one or more prizes based on the number of player indicia matched by the called house indicia.

In the example of sports wagering, a player may be seated in a player area that may include a betting terminal which includes a monitor and input means. A player may make or place periodic wagers on a variety of sporting events.

As the player plays the games, the gaming device and/or a server or another computing device tracks data representative of the gameplay of the player (referred to herein as "gameplay data"), such as a theoretical win or loss, a past history, wager amounts, a number of plays per hour, wager amounts relative to an amount of time spent playing games on the gaming device, a number of wins or losses of the player, a cumulative amount wagered by the player, an amount of money won or lost by the player, and/or any other suitable data. The gameplay data is used to determine whether the player is eligible to receive a comp. The comp may include, for example, one or more free beverages, free meals, free tickets, reduced price meals or tickets, and/or the like.

In one embodiment, a comp indicator is included within, attached to, or displayed on the gaming device. The comp indicator may be energized or activated in any conventional way to indicate status including displaying on the game monitor, player tracking module or the like. The comp indicator is used to display to the player and/or to gaming establishment employees whether the player is eligible to receive the comp. If the gameplay data indicates that the player has reached a predetermined threshold of play and/or wagering activity, for example, the player is determined to be eligible to receive the comp. The comp indicator may then be activated to notify the player and/or gaming establishment employees that the player is eligible to receive the comp. The comp indicator activation may include any suitable means for displaying comp status, comp eligibility, change in comp status, incremental progress toward comps, continual progress toward comps, reduction in comp status after awarding of comps, etc., and may include any visual or sensory indicator or indication. Gaming establishment employees may then take action in response to the notification, such as by awarding the comp to the player. While the comp indicator is sometimes described as being a visual indicator, it should be recognized that the comp indicator may notify the player and/or gaming establishment employees using any suitable sensory perception, via printed comp tickets or the like.

A technical effect of the systems and methods described herein includes one or more of: (a) presenting a game of chance to a player on a gaming device; (b) enabling the player to input money or credits or physical items representing money or credits for use in the game of chance using a payment input device of the gaming device; (c) enabling the player to withdraw money or credits from the gaming device using a payment output device of the gaming device; (d) providing a comp indicator attached to or integrated within the gaming device, wherein the comp indicator is configured to provide an indication if the player is determined to be eligible for a comp; (e) generating gameplay data associated with the game of chance or skill-based game of chance for the player using the gaming device; (f) receiving input from the player at the gaming device to enable the player to play the game of chance; (g) randomly determining a game outcome for the game of chance using a randomization device; (h) transmitting the gameplay data from the gaming device to a computing device; (i) determining, by the computing device, whether the player is eligible for the comp based on the gameplay data; and (j) transmitting data representative of whether the player is determined to be eligible for the comp from the computing device to the gaming device.

Comp monitoring or accounting may also be monitored locally or remotely by management to ensure proper compliance. Systems and methods described herein may be self-contained within a gaming device or may reside in a server-based system such as a slot accounting system (SAS).

As used herein, a "game of chance" or "game" refers to a manual or an electronic game that is played by a player in which an outcome of the game of chance is at least partially based on chance or a random selection of game components or skill-based game components. A game may be categorized by a game variety and/or a game size, for example. It should be recognized by those of ordinary skill in the art that the term "random" is not limited to true randomness, such as truly random numbers. Rather, pseudorandom numbers and pseudorandom algorithms are included within the meaning of "random." In addition, those of ordinary skill in the art will recognize that permutation generators may additionally or alternatively be used to generate player card indicia or other game components.

Gaming devices described herein may use real money for play or may utilize a credit-based system in which the credits used for the games may or may not have a cash value. Similarly, prizes for the games may be in the form of credits, cash, and/or physical prizes such as televisions, automobiles, or the like.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

As used herein, the terms "connect" and "couple" are not limited to only including direct connections. Rather, unless otherwise specified, indirect connections are included within the definitions of "connect" and "couple." For example, two devices may be considered connected even if there are other devices or components connected between the two devices. Any suitable means to connect or couple devices or components together may be used.

A player reward card refers to a physical or electronic card, token, or other device or data that enables a system to identify a player in connection with, among other things, a reward program or campaign. Accordingly, the player reward card may serve to identify the player and may enable gameplay, credits, funds, or other data to be associated with the player. In addition, player card tier levels may be established to denote the level of player play or relative worth to the casino operator.

FIG. 1 is an illustration of an exemplary electronic gaming machine (EGM) 100 that may be used with the systems described herein. In one embodiment, EGM 100 is an electronic table games gaming device (ETG) 114. EGM 100 may include one or more comp indicators 102, which may be incorporated into, or implemented by, a candle device 105, lighting element 130, displayed on monitor 116 or 118, displayed on the player tracking module 134, displayed as a LED indicator on button panel 136, or another device. One or more cameras 132 are provided with or as part of the EGM 100 to capture images of the player or other aspects of game play.

The comp indicator 102 visually notifies or alerts the player or casino staff when the player is determined to be eligible to receive one or more comps from a gaming establishment, for example. The comp indicator 102 may also display or otherwise notify the player of the progress towards attaining the comp or comps. Such comps may include, for example, one or more free beverages, free meals, free rooms, free credits for one or more games of chance, free prizes, free tickets to a performance, free services (e.g., spa services), and/or a discount or reduced price for one or more of the foregoing goods or services (e.g., with respect to a market price of the goods or services). In one embodiment, comp indicator 102 may include an audio notification or other sensory notification in addition to, or in place of, the visual notification. While comp indicator 102 is described as being used with EGM 100, it should be recognized that comp indicator may be used with any gaming device 114 and/or computing device.

The EGM 100 also includes a cabinet 106 configured to support and secure the elements of the EGM. The EGM 100 includes one or more monitors/screens such as an upper screen 118 and a lower screen 116. The screens 116 and 118 may be configured to display game content to the player or any other information regarding the game, the casino, rules, pay tables, promotions, advertisements, or any multimedia content. Any type screen may be used, such as a flat screen or curved screen display. Those skilled in the art will recognize that games or other content may be displayed on a single display as opposed to dual displays or even split into three separate displays. Generally, when content is displayed on a single screen the display is placed in a portrait mode. Additional displays may also be utilized for a variety of purposes such as advertising toppers, wheel toppers, LCD button panels, and the like. Additional lights 130 may be incorporated into the gaming machine to providing lighting for the player or ornamentation for the EGM 100.

A scanner 108 is provided to scan tickets which have bar or box codes, or for scanning money, cards, electronic funds transfer devices, or any other media. In addition, scanner 108 may include other connectivity means such as Bluetooth communications, near field communications or similar. Similar, a card reader 112 is provided to read one or more aspects of cards, such as player tracker or rewards cards, personal identification cards, and/or credit cards. The EGM 100 may also include a printer 110. The printer may print on any type media. Any type of content may be printed including but not limited to cash out tickets, coupons, gift certificates, comps, prizes, gaming codes, redemption codes, bar or box codes, receipts, or any other type of information. Also, part of this embodiment is a cash acceptor 104 configured to accept paper money, ticket-in-ticket-out vouchers, or any type physical item associated with the EGM 100. A USB port 138 or other type charging or 110 port is provided for phone charging or interfacing the user's smart phone to the EGM 100. Numerous other buttons and player interface elements are presented with the EGM 100 to accept player input. The screens 116 and 118 may be configured as touch screens.

Figure 2:
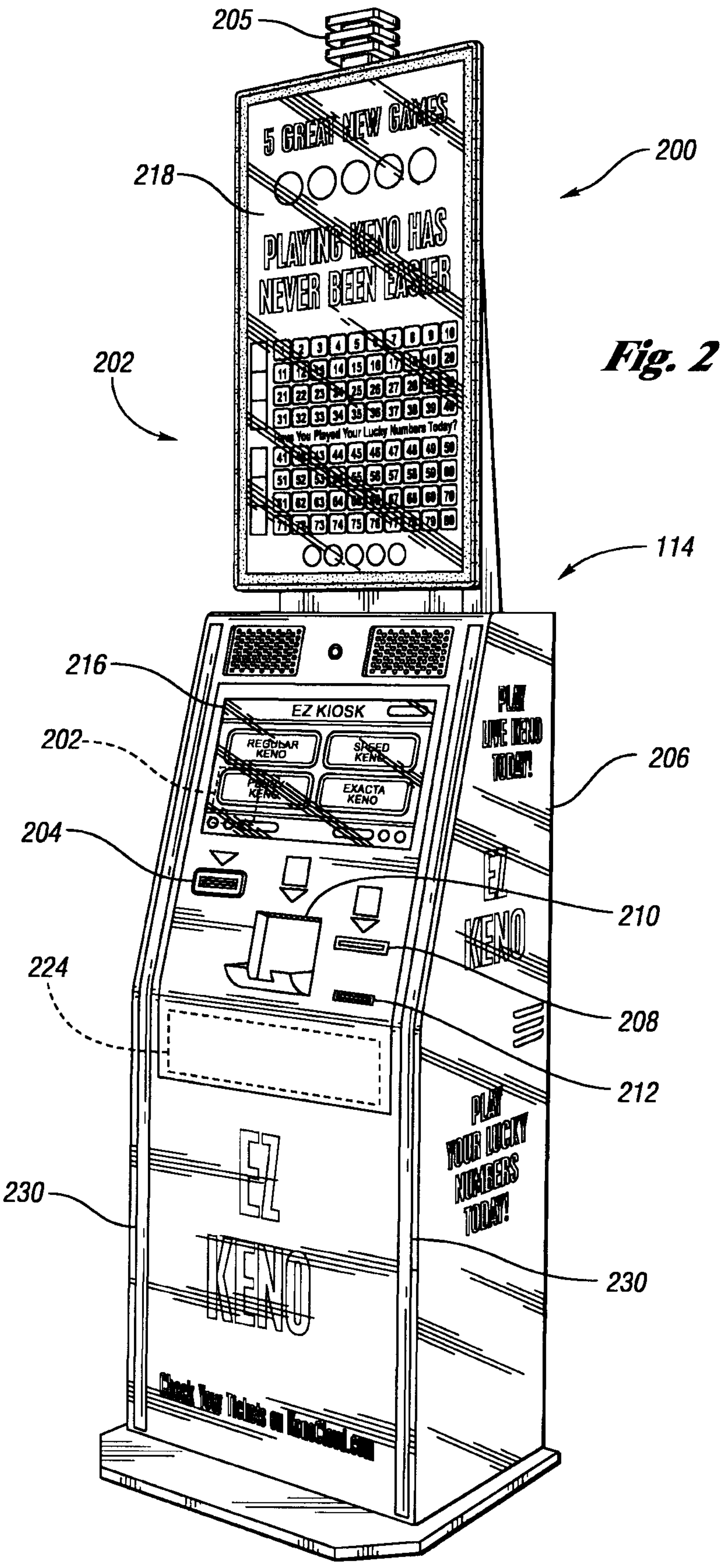
FIG. 2 illustrates an exemplary kiosk of the type that may be used to facilitate the embodiments of the present invention.

FIG. 2 is an illustration of an exemplary kiosk 200 that may be used with the systems described herein. In one embodiment, kiosk 200 is an electronic device provided for users to obtain information, conduct business, enter information, or any other use for which a computing device with communication capability is useful. The kiosk 200 may also be used for gaming for such games as keno, bingo, sports betting, etc. Unless otherwise specified, kiosk 200 shares some components and functionality with EGM 100 (shown in FIG. 1) and similar components are labeled in FIG. 2 with the same reference numerals as used in FIG. 1.

Kiosk 200 may include one or more informational displays 202, which may be incorporated into, or implemented by a first display 216 and/or second display 218. Also shown in association with the kiosk 200 is a keyboard 224 which may be fixed or fold down from the front of the kiosk 200 to provide a user input device. The first display 216 and/or second display 218 may be configured as touch screens thereby allowing user input.

In use, a user may use the kiosk 200 for any use now known or developed in the future. Such uses include but are not limited to, check in or check out of a hotel, spa, restaurant, gaming area, pool, or any other location or service. The kiosk 200 may also be used to sign up for an event or program, such as but not limited to a player reward program, tournament, or event. The kiosk 200 may also be used to purchase tickets, goods or services. One of ordinary skill in the art will arrive at other uses for kiosk 200.

Figure 3:
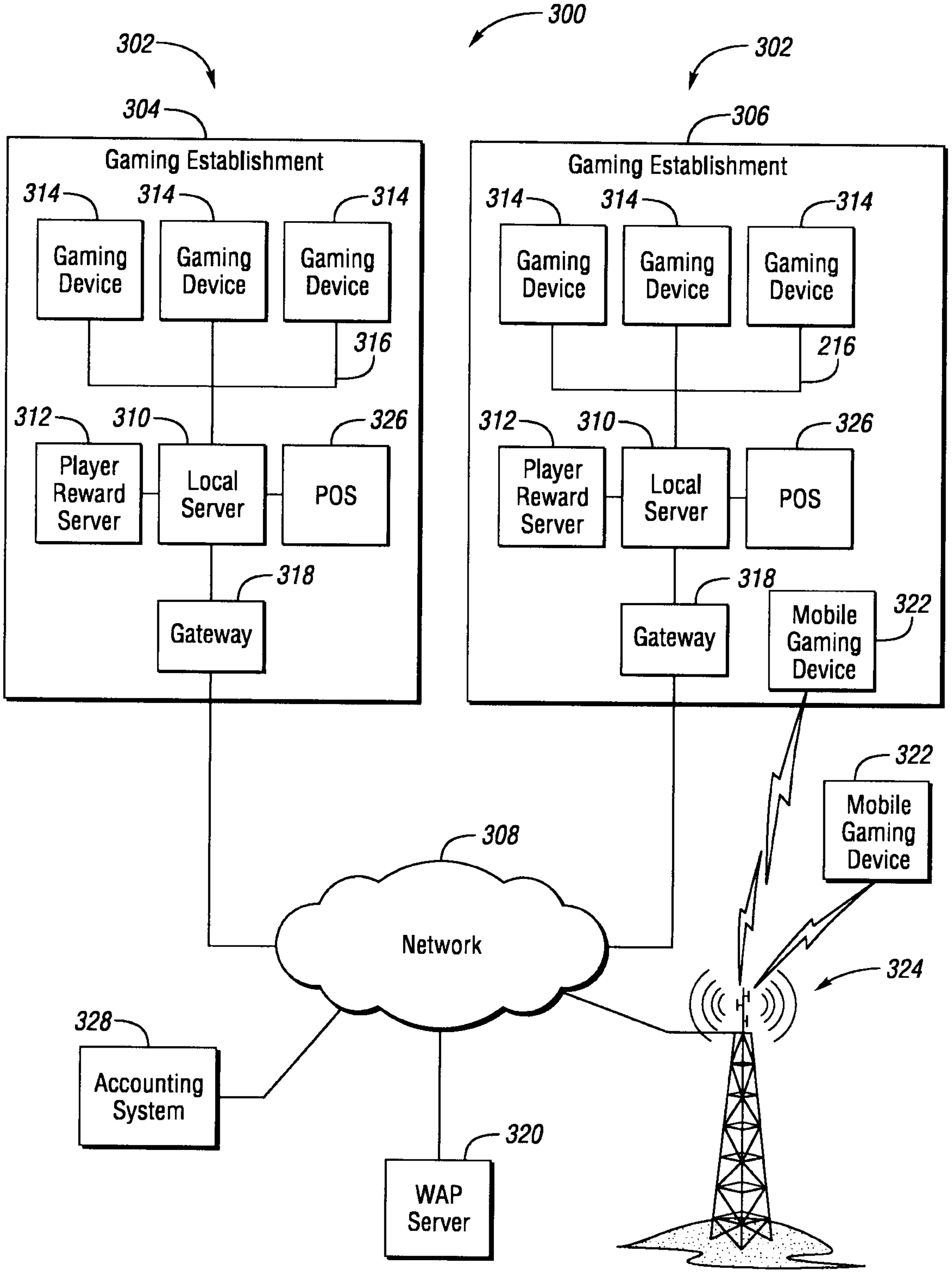
FIG. 3 illustrates a block diagram of a multiple casino property system of the type that may be used to facilitate the embodiments of the present invention.

FIG. 3 is a block diagram of a system 300 that may be used to play one or more games of chance, such as video poker, video slots, sports betting, bingo, keno or any the wagering game. The games of chance may be played by a player against other players or may be played by the player against the house.

System 300 is operated using components and devices within one or more gaming establishments 302, such as a first gaming establishment 304, a second gaming establishment 306, and a Nth gaming establishment 309 (not shown). It should be recognized that any suitable number of gaming establishments 302 may be provided within system 300. Accordingly, system 300 is not limited to including two gaming establishments 302 as illustrated. In one embodiment, gaming establishments 302 are locations in which devices (e.g., gaming devices) that play or operate at least a portion of the games of chance are located. For example, gaming establishments 302 may be casinos, racetracks, bingo halls, keno parlors, or any other establishments. In another example, gaming establishments 302 may be residences or businesses in which one or more devices are located for playing or operating the games of chance. Gaming establishments 302 may additionally or alternatively include any combination of the examples described herein.

In one embodiment, gaming establishments 302 are physically remote from each other and are communicatively connected to at least one network 308, such as a wide area network (WAN), a metropolitan area network (MAN), and/or the Internet, for example. Alternatively, the gaming establishments 302 may be separate rooms or sections of a casino or another facility that are communicatively connected by network 308. It should be recognized that network 308 may be a wired Ethernet network, a wireless Ethernet network, a combination of wired and wireless Ethernet networks, or any other suitable wired and/or wireless network.

In one embodiment, each gaming establishment 302 includes a local game server 310 (referred to herein as a "local server") and a player reward server 312. Local server 310 and player reward server 312 may alternatively be implemented as or within a single server. The local server 310 is coupled to a plurality of the gaming devices 314 through an internal network 316, such as a private local area network (LAN) within the gaming establishment 302, for example. The gaming devices 314 may be located in separate gaming establishments 302, or within the same gaming establishment. In one embodiment, a gateway 318 is provided to enable the local server 310 of each gaming establishment 302 to securely connect to the network 308.

In one embodiment, the local server 310 is a server computer (or "server") that monitors and controls the games played on gaming devices 314, including local games. In one embodiment, the local games include games that are played against the house and/or that are played against other players within gaming establishment 302.

In addition, the local server 310 may administer other background tasks that enable games to be played on the gaming devices 314. For example, the local server 310 may facilitate authenticating gaming devices 314 and the players using the gaming devices 312 and may facilitate allocating payments or credits between players and the house. The local server 310 may include cashless payment processing capabilities to enable players to receive electronic funds from a bank or another financial institution or to deposit electronic funds to the bank or financial institution. Alternatively, the payment processing capabilities may be included in a separate server or another device that is communicatively connected to the local server 310. In addition, the local server 310 may interface with the player reward server 312 to facilitate tracking and administering player rewards. Each gaming device 314, group of gaming devices 314, local servers 310, player reward servers 312, or the like may collect and/or generate data desired for accounting purposes, such as for use in slot accounting systems.

In one embodiment, the local server 310 may enable the gaming devices 314 within the gaming establishment 302 to participate in one or more games that share one or more progressive or pari-mutuel prizes with other gaming establishments 302 and/or gaming devices 314. While progressive prizes are described in embodiments herein, it should be recognized that pari-mutual prizes may be substituted as desired, and vice versa. In such an embodiment, each local server 310 may be coupled to a wide area progressive (WAP) server 320 that administers the prizes. For example, the WAP server 320 receives data from each local server 310 and/or from gaming devices 314 regarding an amount wagered by each player playing the game. WAP server 320 may allocate a portion of each wager to the prizes and may communicate the current prize amounts to local servers 310 and/or to the gaming devices 314.

The gaming devices 314 may include one or more kiosks or electronic gaming machines (EGMs) (also known as "slot machines"). The gaming devices 314 may additionally or alternatively include one or more desktop computers or one or more mobile gaming devices 322, such as, without limitation, cellular phones, tablet computing devices, and/or laptops. Mobile gaming devices 322 may connect to local server 310, WAP server 320, and network 308 via a wireless data network represented by cell tower 324. For example, mobile gaming devices 322 may connect to any suitable network 308 (and thereby to local servers 310 and/or WAP server 320) via a "3G", "4G" or a "5G" wireless data network. It should be recognized that mobile gaming devices 322 may additionally or alternatively connect to network 308 using any suitable wireless network, such as a wireless Ethernet network. For convenience, gaming devices 314 described herein may also include mobile gaming devices 322.

One or more point-of-sale ("POS") terminals 326 or redemption kiosks may also be included within each gaming establishment 302 to enable players to "cash out" winnings from one or more gaming devices 314 and/or to perform other account management activities related to player accounts. The POS terminals 326 may be connected to the local server 310, for example, and/or to the WAP server 320 as desired.

In addition, the system 300 may include an accounting or auditing system 328 coupled to WAP server 320, the local server 310, and/or a gaming device 314, for example, through network 308. Accounting (auditing) system 328 may be used to audit and/or track components of system 300 to ensure compliance with applicable regulations.

In one embodiment, a plurality of gaming devices 314 having different operating systems and/or system architectures may connect to the local server 310 or to another suitable server to play one or more games of chance. In such an embodiment, the gaming devices 314 may be used to play a session bingo game, for example, or any other game of chance.

During operation, the player utilizes or selects a gaming device 314 and initiates a gaming session for playing one or more games of chance ("Games"). Optionally, the player inserts a player reward card or enters a player reward number or other identification information into gaming device 314. If the identification information is entered, the gaming device 314 may transmit the identification information to local server 310 or accounting system 328 for authentication, or authentication may be accomplished locally within the gaming device 314. The local server 310 communicates with player reward server 312 to establish the player's identity and to associate the gameplay with the player account. The local server 310 authenticates the player and gaming device 314 and authorizes the player to play the game or games on gaming device 314 if desired or required.

When game play is initiated, during selection of the game, or during play of the game, the player may be required to purchase or generate credits. The player may purchase or generate credits by inserting cash or a ticket-in-ticket-out voucher into gaming device 314, using cashless transfer systems, or another device. Cash, ticket-in-ticket-out vouchers, credit cards or debit cards are examples of physical items associated with the gaming device. Alternatively, or additionally, the player may transfer credits or cash to the gaming device 314 from banking accounts, credit accounts, gaming establishment accounts, and/or gaming company accounts via cashless systems. In one embodiment, computer-generated credits may be used with gaming device 314, for example, as part of a free-to-play game.

In practice, the player selects a game to play and enters a wager on the gaming device 314. The gaming device 314 transmits data representative of the selected game and the wager to the local server 310. If the player selects a game that is at least partially operated by the WAP server 320 or that includes one or more progressive prizes administered by WAP server 320, local server 310 transmits the wager and game information and/or selection to WAP server 320. The WAP server 320 may increment the progressive prizes based on the wager received from the player and may communicate the updated prize amounts via the network 308 to all other players (via associated gaming devices 314) playing to win the progressive prizes.

The player plays the game on the gaming device 314. The following gameplay is described as being administered by the WAP server 320. However, it should be recognized that the gameplay (i.e., the play of the game of chance) may be alternatively or additionally administered by the local server 310 and/or the gaming device 314. For example, if the gaming device 314 is a cellular phone or a tablet computing device, the gameplay may be administered through an application installed on the gaming device 314.

In one embodiment, the player may play a game of bingo by selecting a game or game type, one or more player cards, selecting one or more winning patterns for the player cards, and/or selecting one or more numbers or other player indicia for the player cards using the gaming device 314. The selected player cards, winning patterns, and player indicia are transmitted to WAP server 320. The player cards are included within one or more game tickets issued by WAP server 320, and the game tickets are communicated to the gaming device 314 via the network 308 and the local server 310. The WAP server 320 selects or receives randomly generated house indicia and compares the house indicia to the player indicia and the pattern or patterns selected for the player cards. Alternatively, the functions described herein (e.g., comparing the house indicia to the player indicia and the pattern or patterns selected for the player card) may be performed in the gaming device 314. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated. In an alternative embodiment, the WAP server 320 (or another device) may designate a server, computer, or another device to provide randomly selected house indicia during the game and may receive the house indicia from the designated device.

WAP server 320 determines whether the player wins a prize based on the comparison of the house indicia to the player indicia. For example, WAP server 320 determines whether the player indicia within the pattern or patterns selected for each card match the house indicia that were randomly determined (sometimes also referred to as the house indicia that were "called"). If the player indicia within a pattern match the called house indicia, the player may win a prize based on a pay table associated with the game. The prize may be one of the progressive prizes or the prize may be a fixed prize identified in the pay table. WAP server 320 determines the appropriate payout to be paid to the player based on the pay table and transmits data representative of the payout to local server 310.

Local server 310 receives the payout data and credits the player account accordingly. In addition, local server 310 may transmit the gameplay data and/or payout data to player reward server 312 to enable player reward server 312 to update the player history and other gameplay data for the player. When the player is done playing, the player may "cash out" some or all of the credits in the player account or may deposit the credits into the player account using POS terminal or kiosk 326, or apply credits to a cashless system, for example. The player account may be stored on gaming device 314, local server 310, player reward server 312, remote server, for example.

In one embodiment, the player may enter the wager and/or may initiate play of the game on a first gaming device 314 and may complete the gameplay on a second gaming device 314. Alternatively, the player plays the game on the first gaming device 314 and receives the results of the gameplay (e.g., whether the player won and how much the winnings are) on the second gaming device 314. For example, the player may begin playing the game on a kiosk or electronic gaming machine and may complete the game or view the results of the game on a cell phone. In such an embodiment, the WAP server 320 and/or local server 310 may transmit the player's gameplay data from the first gaming device 314 to the second gaming device 314.

Figure 4:
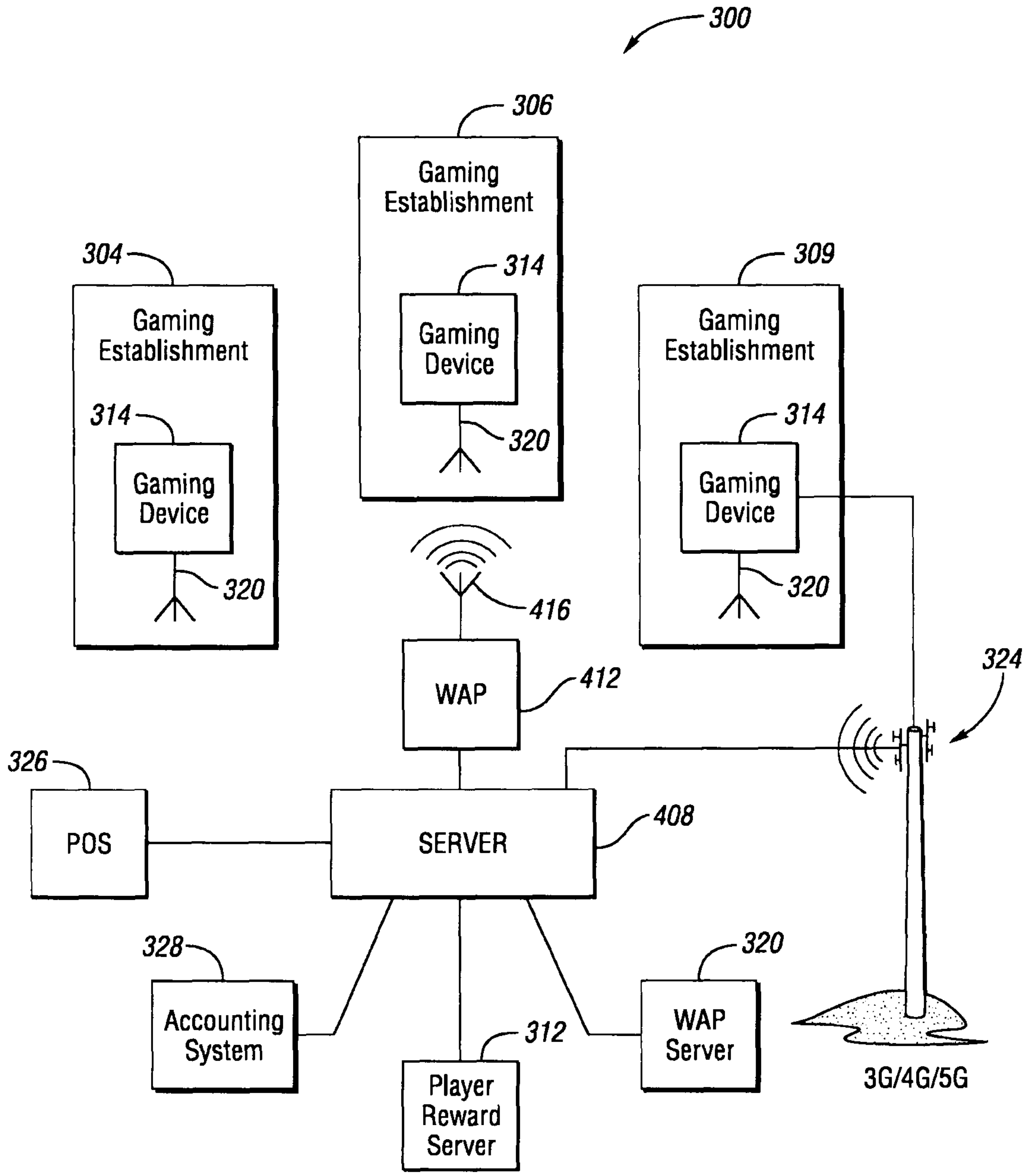
FIG. 4 illustrates a block diagram of a wireless network system of the type that may be used to facilitate the embodiments of the present invention.

FIG. 4 is a block diagram of another system 300 that may be used to play one or more games of chance, such as a slot, bingo, keno, or any game of chance. Unless otherwise specified, the system 300 is similar to system 300 (shown in FIG. 3) and similar components are labeled in FIG. 4 with the same reference numerals used in FIG. 3. It should be understood that more or less components may be included within the various embodiments described herein.

In the embodiment shown in FIG. 4, the system 300 includes a plurality of gaming devices 314 that are positioned in a plurality of gaming establishments 302. Gaming devices 314 may connect to a server 408 through a wireless access point 412. The wireless access points 408 includes an antenna 416 configured to wirelessly transmit to and receive signals from antennas 320 associated with the gaming devices 314. Wireless communications systems and methods are understood by one of ordinary skill in the art and as such are not described in detail here. For example, the gaming devices 314 may be playing one or more stand alone or Internet-based games that connect to the WAP server 320 through a server 408. In some embodiments, one or more gaming devices 314 may connect to the WAP server 320 and/or to the player reward server 312 through a wireless data network as described above. Accordingly, the gaming devices 314 interact with WAP server 320 to play the game, and WAP server 320 performs the game administration and other tasks handled by local server 310 as described above in FIG. 3. In a similar manner, a POS terminal 326 may connect to a gaming device 314 and/or WAP server 320 via network 308. In other respects, system 300 performs in a similar manner as described above.

During operation, the player utilizes or selects a gaming device 314 and initiates a gaming session to play one or more games on the gaming device 314. The player inserts a player reward card, enters a player reward number, provides biometric information, provides electronic identification via a cell phone or the like, or other identification information into the gaming device 314. In some instances, additional second or third authentication means are utilized such as passwords, fingerprint scans, biometric information, or the like. The gaming device 314 transmits the identification information to player reward server 312 to establish the player's identity and to associate the gameplay with the player account. The player reward server 312 authenticates the player and the gaming device 314 and may authorize the player to play the game on the gaming device 314. In one embodiment, the gaming device 314 also transmits the identification information to the WAP server 320 to enable the WAP server 320 to associate the player with the game to be played. As previously described, player identification or authentication may be optional.

In another embodiment, the WAP server 320 authenticates the player using the player identification information in addition to, or instead of, the authentication performed by the player reward server 312. In some embodiments, the player reward server 312 is omitted and the functions of player reward server 312 are incorporated within WAP server 320.

The player selects a game to play and enters a wager using gaming device 314. If the player selects a game that is operated by the WAP server 320 or that includes one or more progressive prizes administered by the WAP server 320, the gaming device 314 transmits the wager and game selection to the WAP server 320. The WAP server 320 may increment the progressive prizes based on the wager received from the player and may communicate the updated prize amounts over the wireless channel via the server 408 to all other players (via associated gaming devices 314) playing to win the progressive prizes.

Although shown as a wireless network, it is contemplated that the same functionality may be implemented in a wired system, or any combination of both.

The player plays the game on gaming device 314. The following gameplay is described as being administered by the WAP server 320. However, it should be recognized that the gameplay may be alternatively or additionally administered by the gaming device 314. For example, if the gaming device 314 is a cellular phone or a tablet computing device, the gameplay may be administered through an application installed on gaming device 314.

Figure 5:
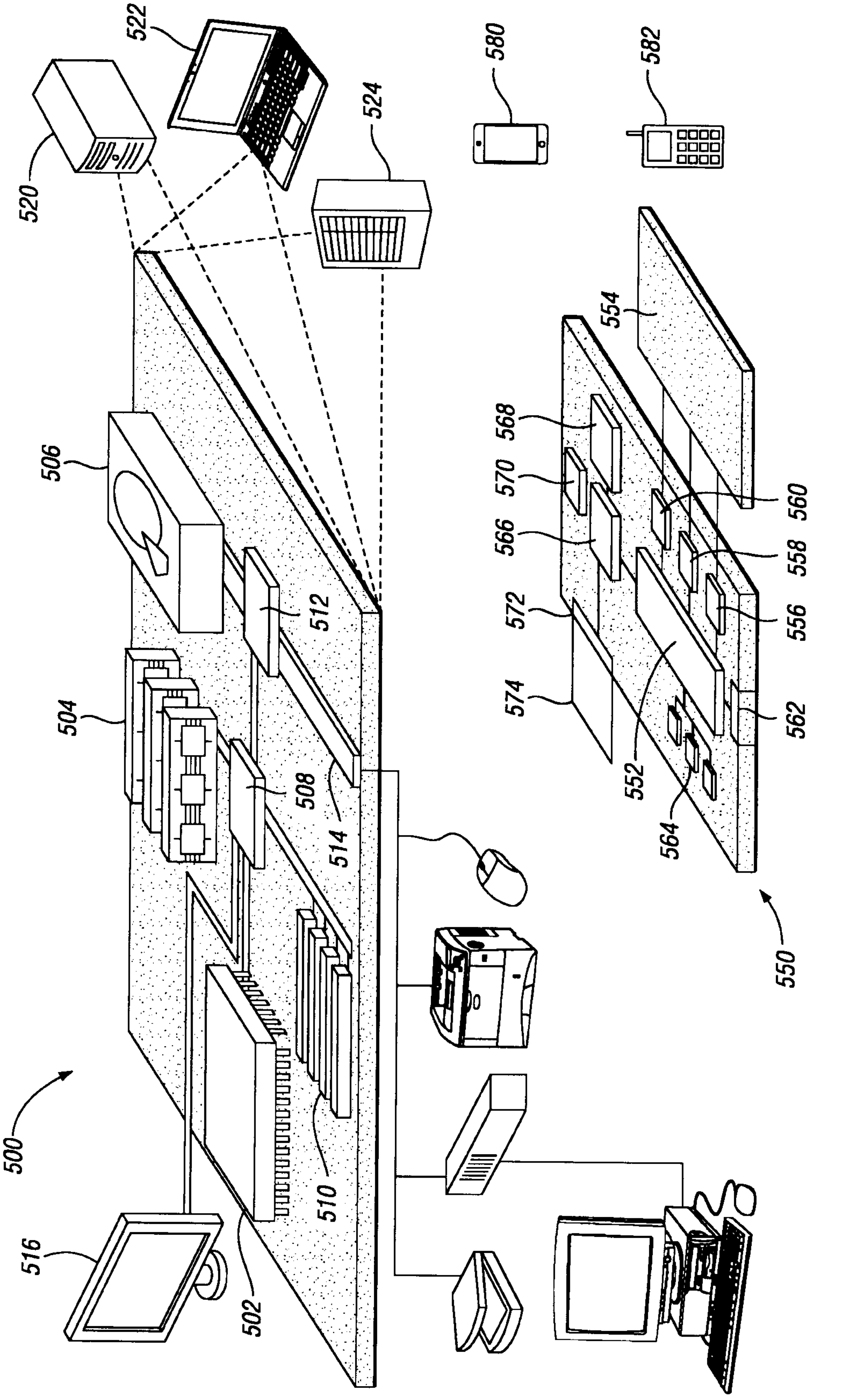
FIG. 5 illustrates a diagram of exemplary components of a computing device of the type that may be used to facilitate the embodiments of the present invention.

FIG. 5 is a schematic of a computing or mobile device, or server, such as one of the devices described above, according to one exemplary embodiment. Computing device 500 is intended to represent various forms of digital computers, such as smartphones, tablets, kiosks, laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 500 includes a processor 502, memory 504, a storage device 506, a high-speed interface or controller 508 connecting to memory 504 and high-speed expansion ports 510, and a low-speed interface or controller 512 connecting to low-speed bus 514 and storage device 506. Each of the components 502, 504, 506, 508, 510, and 512, is interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed bus 514, which may include various communication ports (e.g., USB, Bluetooth, Ethernet, wireless Ethernet or the like) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a micro-drive or other device, to provide additional storage. Each of the components 550, 552, 564, 554, 566, and 568, are interconnected using various buses or similar, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or a QLED (Quantum Light-Emitting Diode), or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550 or may also store applications or other information for device 550. Specifically, expansion memory 574 may include instructions to carry out or supplement the processes described above and may include secure information also. Thus, for example, expansion memory 574 may be provide as a security module for device 550 and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 560. It may also be implemented as part of a smart phone 582, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices ("PLDs") used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube), LCD (liquid crystal display), or other monitor types) for displaying information to the user and a keyboard and a pointing device (e.g., a mouse, joy stick, trackball, or similar device) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 500 and/or 550) that includes a back end component (e.g., as a data server, slot accounting system, player tracking system, or similar), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 6:
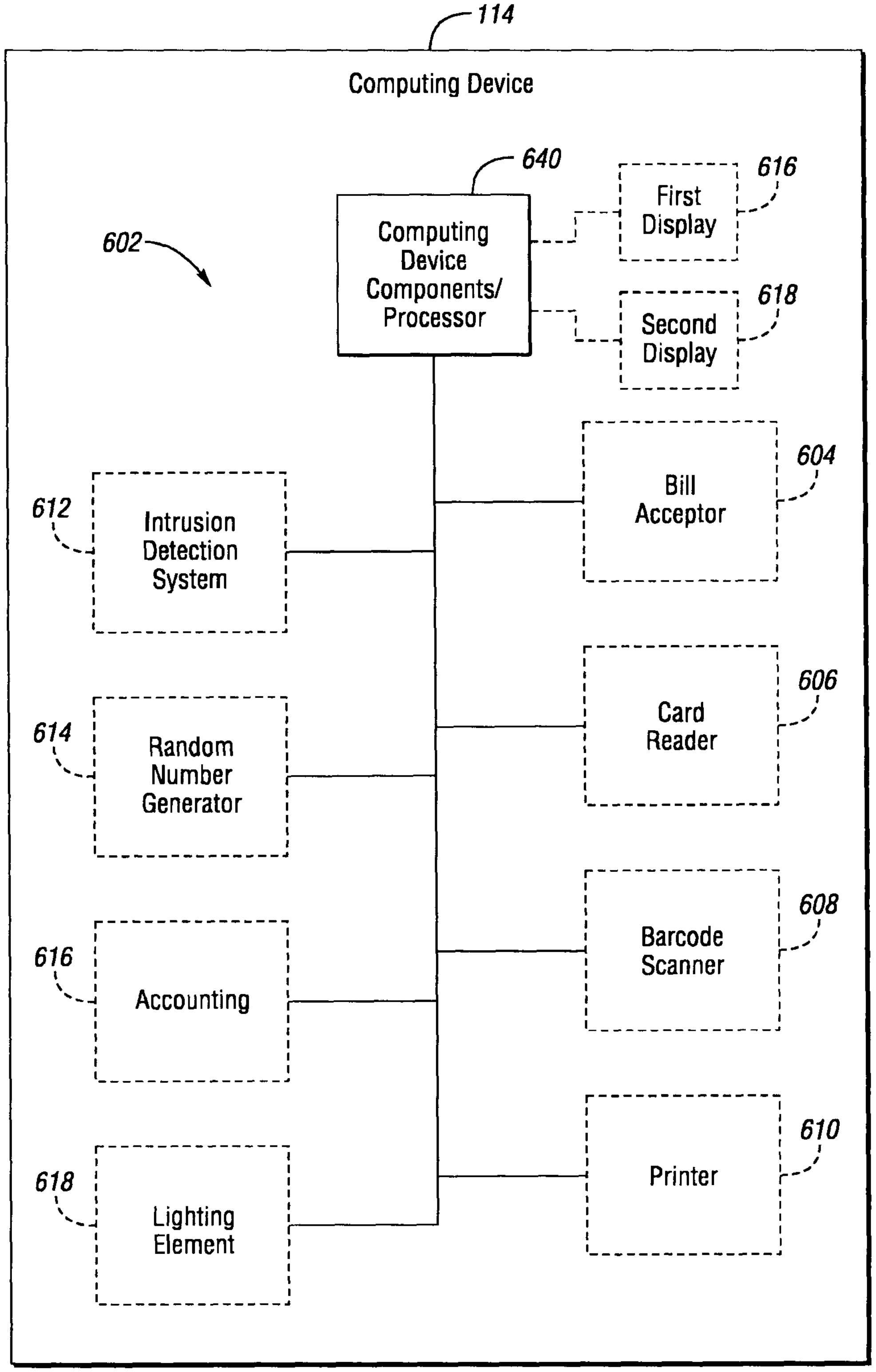
FIG. 6 illustrates a diagram of exemplary gaming device hardware of the type that may be used to facilitate the embodiments of the present invention.

FIG. 6 is a block diagram of a gaming device 114 that may be used with system 300 (shown in FIG. 3) or system 400 (shown in FIG. 4). As described above, the gaming device 114 is a computing device 200 (such as an EGM) that includes a plurality of computing device components 602 positioned within or on a cabinet or other housing. In one embodiment, computing device component manager or processor 640 include first display 116 and second display 118. In addition, gaming device 114 may include a plurality of gaming device components 602 including a bill acceptor or bill validator 604, a card reader 606, a barcode scanner 608, a printer 610, an intrusion detection system 612, a randomization device 614 (such as an RNG), and an accounting interface 616 that are positioned within, or coupled to, the cabinet or housing of the gaming device. In one embodiment, gaming device 114 may also include at least one lighting element 618 coupled to the cabinet or housing.

It should be recognized that in some embodiments, a gaming device 114 may not include each gaming device component 602 illustrated in FIG. 6. For example, if the gaming device 114 is a cellular phone or a tablet, the gaming device may not include bill acceptor 604, card reader 606, barcode scanner 608, and/or printer 610. Rather, in some embodiments, the functions of each omitted gaming device component may be replaced by equivalent software, hardware, and/or firmware if desired. Optional components may be designated using dashed lines in the figures.

The bill acceptor 604 is a payment input device that enables gaming device 114 to receive and identify paper currency, ticket-in-ticket-out vouchers, or other physical items representing a monetary value. For example, bill acceptor 604 may receive and identify dollar bills or other currency that are inserted into bill acceptor 604. In one embodiment, bill acceptor 604 includes a scanner that scans paper currency inserted therein. The bill acceptor 604 may also include optical character recognition (OCR) capabilities that enable bill acceptor 604 to identify the amount of currency inserted into bill acceptor 604 from a scanned image of the currency. The bill acceptor 604 may transmit data representative of the amount of currency inserted into gaming device 114 to controller or processor 640, for example. The controller or processor 640 may cause the amount of currency to be converted into credits usable with the game and may add the credits to the player's account. Those skilled in the art will recognize that similar principals apply to cashless wagering systems.

The card reader 606 is a device that "reads," or obtains data encoded in, player reward cards or other cards or media that are inserted into reader. In one embodiment, the card reader 606 is a magnetic or optical card reader that reads barcodes or magnetic strips included within a player reward card. In another embodiment, the card reader 606 wirelessly reads data encoded within the player reward card by accessing a chip, such as a radio frequency identification ("RFID") chip, embedded within the card or other similar authentication means. The card reader 606 reads the data obtained from the cards and transmits the data to the computing device components/processor 640. In one embodiment, the card reader 606 is used to read player identification information encoded within player reward cards. Those skilled in the art will recognize various means of player identification as herein described. The controller or processor 640 may transmit the player identification information to player reward server or other external component to identify the player, track past or present player activity, to allow for the transfer of funds or credits, to facilitate authenticating the player, and/or to authorize the player to play a game on gaming device 114. Those skilled in the art will recognize that many alternate means of electronic funds transfer may be employed in a cashless system and may include near field communication, Bluetooth communication, wireless communication, biometric identifications, etc., which may be associated with bank accounts, credit card accounts, gaming related accounts, player accounts, debit accounts, etc. Even in a cashless system, a bill acceptor or similar, accepting a physical item such as currency or ticket-in-ticket-out vouches or similar may also be employed for those not utilizing the cashless system. In one embodiment, the player may "log in" to the gaming device 114 by swiping the player reward card or otherwise passing the player reward card through or inserting the player reward card into the card reader 606. In another embodiment, the player may enter a number or other identifier associated with the player reward card into the gaming device 114, through the user interface devices for example, instead of using the card reader 606. In another embodiment, the insertion of the player reward card and player entering the identifier into user interface device may be combined. In yet another embodiment, the player may use a near field communication ("NFC") device to read the player reward card or data representative of the player card. Alternatively, the player reward card may be associated with an application on a cell phone or tablet which wirelessly communicates with the card reader or similar system.

In one embodiment, the barcode scanner 608 is an optical or a magnetic scanner that is optimized to read barcodes on media positioned proximate to the scanner and may also include RFID sensors, blue tooth connectivity, near field communications devices, etc. For example, the barcode scanner 608 may be optimized to read barcodes printed on paper receipts (sometimes referred to as "tickets" or vouchers, not to be confused with game or player tickets that may include player selected patterns, player indicia, and the like) and/or barcodes displayed electronically on a cell phone or tablet computing device. It should be recognized that the barcodes read by the barcode scanner 608 may be linear or one-dimensional barcodes, two-dimensional barcodes, or may even include data represented in a form other than a barcode. For example, the barcode scanner 608 may read images and/or text indicative of data, such as currency or credits, usable with gaming device 114. The barcode scanner 608 extracts the data from the barcode and transmits the data to controller/processor 640. For example, the barcode scanner 608 may scan a paper receipt or voucher that includes an amount of currency or credits usable by the player with a gaming device 114 and may transmit the amount of credits to the controller/processor 640. In such an example, the barcode scanner 608 may act as a payment input device. The controller/processor 640 may cause the amount of currency or credits to be displayed to the player on first display 616 (or on any display) to inform the player how many credits or currency is available to be used in playing a game.

The printer 610 may be used to print paper receipts (also known as tickets as described above), ticket-in-ticket-out vouchers, or other physical items representing a monetary value that indicate an amount of currency or credits available to the player, player comps, and the like. In many locations, the tickets or receipts may alternatively be referred to as vouchers. The printer 610 may act as a payment output device that enables a player to cash out or withdraw money or credits from the gaming device 114 by printing a voucher representative of the money or credits. In one embodiment, the printer 610 is a thermal printer that is fed by a roll of paper or any suitable paper stock. In a further embodiment, the roll of paper includes one or more watermarks that are visible when the printer 610 has printed the receipt on the paper. Alternatively, the printer 610 may print the watermark on the receipt, or may include another security mechanism to facilitate preventing counterfeit receipts from being made. For example, the printer 610 may include an image or a code on the receipt that identifies the gaming device 114, the printer 610, or another component of the gaming device along with a time that the receipt was printed, serial number, date, location, or other desired information. Other suitable security mechanisms may be used as well. It should be recognized that the barcode scanner 608 and the printer 610 may cooperate such that a security mechanism printed on the receipt may be received and validated by the barcode scanner, in conjunction with controller/processor 640, for example. The barcode scanner 608 may be located remotely from the gaming device 114, such as within a redemption kiosk, a casino cage, or the like.

The intrusion detection system 612 notifies the controller/processor 640 if a case, cabinet, or other housing enclosing components of the gaming device 114 is opened or modified without authorization. In one embodiment, the intrusion detection system 612 includes a pair of contacts that may be physical, magnetic, optical, or similar that transmit an electronic signal to the controller/processor 640 if the housing of the gaming device 114 is opened (e.g., if the opening of the housing separates the contacts). In another embodiment, the intrusion detection system 612 may include a light sensor that detects a change in the light within the housing of the gaming device 114. The intrusion detection system 612 may also include a key or another mechanism for disabling the operation of the game or transmission of the signal to the controller/processor 640 in the event that maintenance or other authorized or unauthorized access to the gaming device 114 components is desired or occurs.

In one embodiment, the intrusion detection system 612 includes a software program (a "monitoring program") that monitors one or more applications installed on the gaming device 114. For example, if the gaming device 114 is a cell phone that includes an application for playing the game thereon, the monitoring program may monitor the application to determine whether the application is modified without authorization. In one embodiment, the monitoring program stores a hash value or a digital fingerprint of the application when the application is installed and/or when the application undergoes authorized modification (e.g., if the application is updated or patched). However, if the monitoring program determines that the application has been modified without authorization, the monitoring program may cause a signal or another notification to be transmitted to the controller/processor 640. For example, the monitoring program may periodically calculate a new hash value of the application and/or create a new digital fingerprint of the application. The monitoring program then compares the new hash value and/or digital fingerprint to the stored hash value and/or digital fingerprint. If the hash values or fingerprints are different, the monitoring program may determine that the application has been modified without authorization. It should be understood that the hash value, the monitoring program, and/or the digital fingerprint may be generated by any suitable means and may be encrypted for additional security.

In response to the signal or notification from the intrusion detection system 612 and/or the modification program, the controller/processor 640 may perform one or more actions. For example, the controller/processor 640 may alert an administrator within gaming establishment by transmitting a message via communication device, may cause audio output device to emit an alarm or another audible alert, may cause a display 116, 118 to display an error or a warning, message, and/or may disable the application and/or the gaming device 114 such that the game is unable to be played on the gaming device.

In one embodiment, the randomization device is an electronic random number generator ("RNG") or pseudo random number generator ("PRNG") 614 or a permutation generator that may be implemented by a dedicated hardware device with associated embedded software. Electronic random number generators or pseudo random number generators are used interchangeably herein. Alternatively, the RNG 614 or the permutation generator may be implemented entirely in software executing on gaming device 114. The RNG 614 may be used to randomly determine a game outcome for the game of chance. In one embodiment, the RNG 614 or the permutation generator provides house or game draws of between 1 and n numbers, where n may be a suitable number based on the game type selected to be played by the player. The RNG 614 or the permutation generator may be programmed via hardware, software, or firmware to provide a particular range of numbers (or other indicia) and numbers of draws for a particular application. For example, in one embodiment of bingo according to the present disclosure, the RNG 614 or the permutation generator initially provides 24 randomly generated numbers having values between 1 and 75 for each game. In other embodiment other methods or numeric values may be used. Additional draws or numbers may be provided to play the game to conclusion depending on the particular implementation as described in greater detail herein. In addition, the RNG 614 or the permutation generator may be used to randomly select a plurality of player indicia to be used with one or more player cards. In embodiments in which a processor, such as controller/processor 640, is described as randomly selecting indicia, it should be recognized that controller/processor may interface with randomization device 614 or the permutation generator to select the indicia. In other embodiments, controller/processor 640 may include randomization device 614 or the permutation generator, or may execute instructions to perform the functions of randomization device 614 or the permutation generator.

The accounting interface 616 is used to interface with an accounting system, such as a slot accounting system, at or operated by a gaming establishment. Accounting interface 616 may include or be connected to a network interface, such as the communication device 308 for use in communicating gameplay data, player identification information, and/or other data to the accounting system for accounting and/or auditing purposes.

The lighting element 618 may include, for example, one or more LEDs, slot machine candles, fluorescent tubes, and/or any other element that emits light as controlled or directed by the controller/processor 640. In one embodiment, the lighting element 618 is activated to display light, or one or more lighting patterns, when the controller/processor 640 determines that a winning ticket was scanned via the card reader 606 or when the controller/processor otherwise determines that a ticket is a winning ticket. The lighting elements 618 may also be activated upon receipt of a signal from the intrusion detection system 612 (e.g., upon the determination that the gaming device 114 has been opened and/or modified without authorization) and/or upon any other suitable determination.

In one embodiment in which the gaming device 114 or kiosk may interface with another gaming device operated by or otherwise associated with the player, such as a cell phone, tablet, or another mobile device. For example, the gaming machine or kiosk may be configured to transmit a result of one or more games of chance to the player's mobile device to notify the player whether one or more player cards or game tickets are winning cards or tickets.

Figure 7:
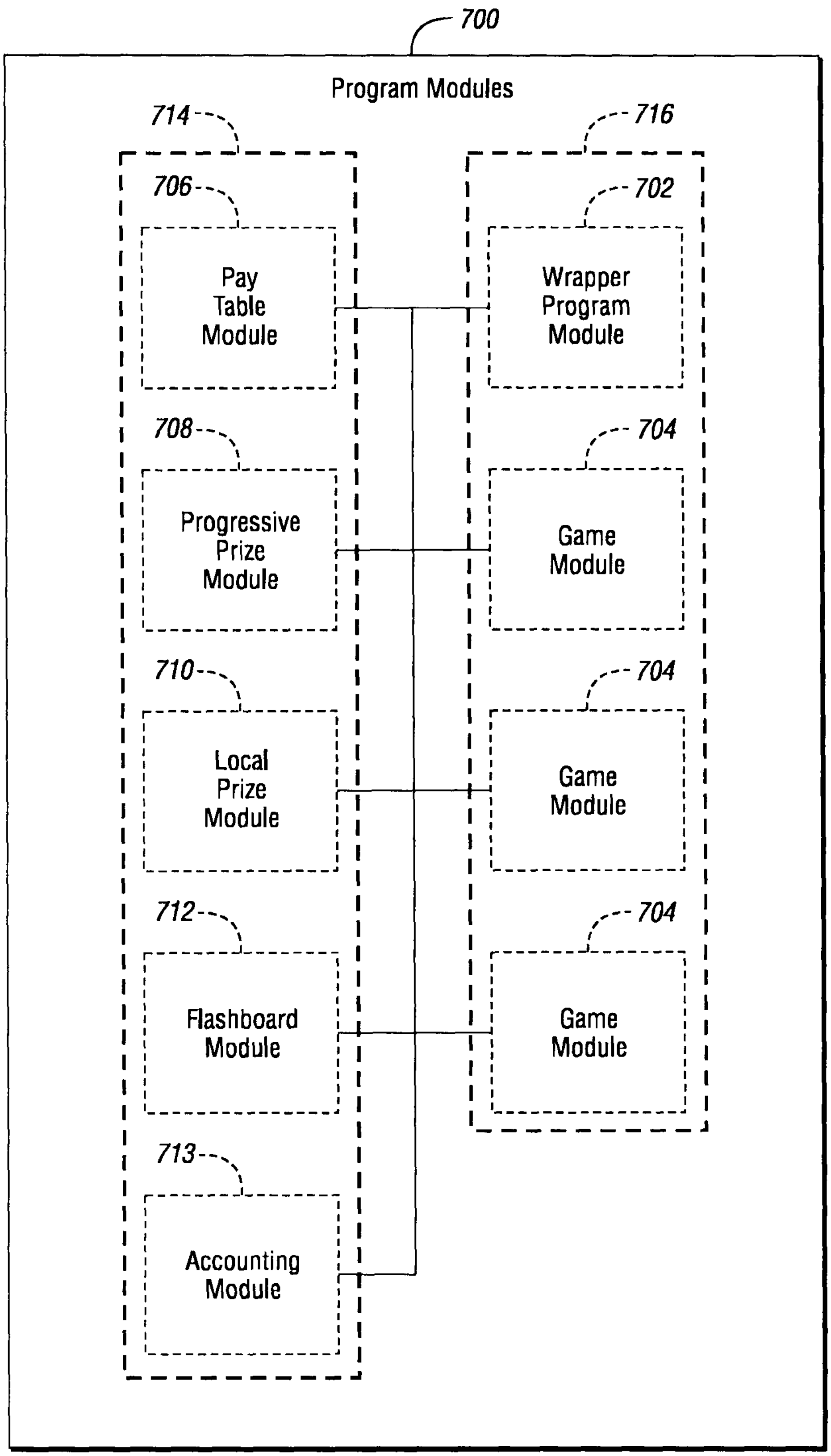
FIG. 7 illustrates a diagram of gaming device program modules of the type that may be used to facilitate the embodiments of the present invention.

FIG. 7 is a block diagram of a plurality of program modules 700 that may be used with the systems shown and described herein to administer one or more games of chance. In one embodiment, one or more program modules 700 are installed and/or stored within local server, WAP server, and/or gaming devices. For example, program modules 700 may be stored in memory device of local server, WAP server, and/or gaming devices.

The program modules 700 are hardware, firmware, or software programs or applications that, when executed by a processor, cause the processor to perform the functions described herein. In one embodiment, the program modules 700 include a wrapper program module 702, a plurality of game modules 704, a pay table module 706, a progressive prize module 708, a local prize module 710, a flashboard module 712, and/or an accounting module 713. A first plurality 714 of the program modules 700 may be installed within each local server and/or WAP server and a second plurality 716 of the program modules 800 may be installed within each gaming device. It should be recognized that in embodiments in which the game of chance is administered by gaming device (e.g., when a cell phone or a tablet computing device is used as gaming device), some or all of the first plurality 714 of program modules 700 may be incorporated within gaming device and executed by a processor of a gaming device. Alternatively, some or all of the second plurality 716 of the program modules 700 may be incorporated within a local server and/or WAP server. Together, the wrapper program module 702, the game modules 704, and the other program modules 700 that present and/or administer one or more games may be referred to herein as a game application, or an application.

In one embodiment, the wrapper program module 702 is used at least in part to provide a graphical user interface ("GUI") on a first display of the gaming device. The wrapper program module 702 operates to provide an entry point or a game entry interface for a player to access the gaming device, and to enable the player to select a game of chance to be played on the gaming device. For example, the games of chance may be categorized into a plurality of game sizes and a plurality of game variations. The wrapper program module 702 may present the game sizes and the game variations to the player, using a display, and may enable the player to select a game to play by selecting a game size and game variation through user interface device.

In one embodiment, the wrapper program module 702 may present a list of games or game variations to the player for selection on a display. If the player selects a size and variation, wrapper program module 702 calls or branches to a game module 704 that provides the selected game and variation.

In one embodiment, the game modules 704 each provide a game associated with the selected game size and/or game variation to the player using gaming device, local server, and/or WAP server. Accordingly, in one embodiment, each game is provided by a separate game module 704. Alternatively, each game module 704 may provide more than one game to the player.

The pay table module 706 provides a pay table associated with each game such that one or more pay tables may be associated with each game module 704. In one embodiment, the pay table module 706 provides a pay table associated with a game when the game module 704 requests the pay table and/or when a predetermined event occurs during the game. The pay tables associated with a game may be changed as desired by a game operator by any suitable means. The predetermined event may include, for example, the player selecting a "See Pays" or another icon displayed on the display that represents a request to view the pay table for the game. The predetermined event may also include reaching a point in the game in which the house indicia are matched to the player indicia within a selected pattern to determine whether the player wins a prize.

The progressive prize module 708 may be used to administer aspects of one or more progressive prizes, such as one or more progressive prizes offered to players playing across network. For example, the progressive prize module 708 may receive information regarding an amount wagered by each player playing a game that has a chance to win the progressive prize. The progressive prize module 708 may allocate a first portion of each wager to a first progressive prize to increase the size of the progressive prize. The progressive prize module 708 may allocate a second portion of each wager to a second progressive prize, and may continue in a similar manner for any additional progressive prizes, if desired or applicable. Accordingly, a plurality of progressive prizes may be provided for each game and may be at least partially funded by each or selected wagers.

The local prize module 710 may be used to administer aspects of one or more local prizes, such as one or more prizes that may be won by players playing against each other within a gaming establishment. In addition, the local prize module 710 may administer aspects of one or more fixed prizes, such as prizes that may be won only by individual players playing on respective gaming device. Accordingly, fixed or individual prizes may be awarded to a player based on the gameplay of the player relative to a randomization device of gaming device, rather than based on winning against other players.

In one embodiment, the slot module 712 may be used to control and conduct slot games in the manner and for the purposes detailed below.

The accounting module 713 may be used to interface with an accounting system, such as a slot accounting system or auditing system, at or operated by a gaming establishment. In one embodiment, the accounting module 713 is incorporated within, or executed by, accounting interface. Any suitable data, such as gameplay data, player identification information, prizes won by a player, and/or any other suitable data may be collected and transmitted by the accounting module 713.

It should be recognized that two or more program modules 700 may be combined together such that the functionality of each program module 700 is incorporated into the combined module. Likewise, each program module 700 may be split into two or more sub-modules that each perform a portion of the functionality of the program module 700 being split. Accordingly, while the above-described program modules 700 are described individually, each may be combined or split into other sub-modules as desired.

Figure 8:
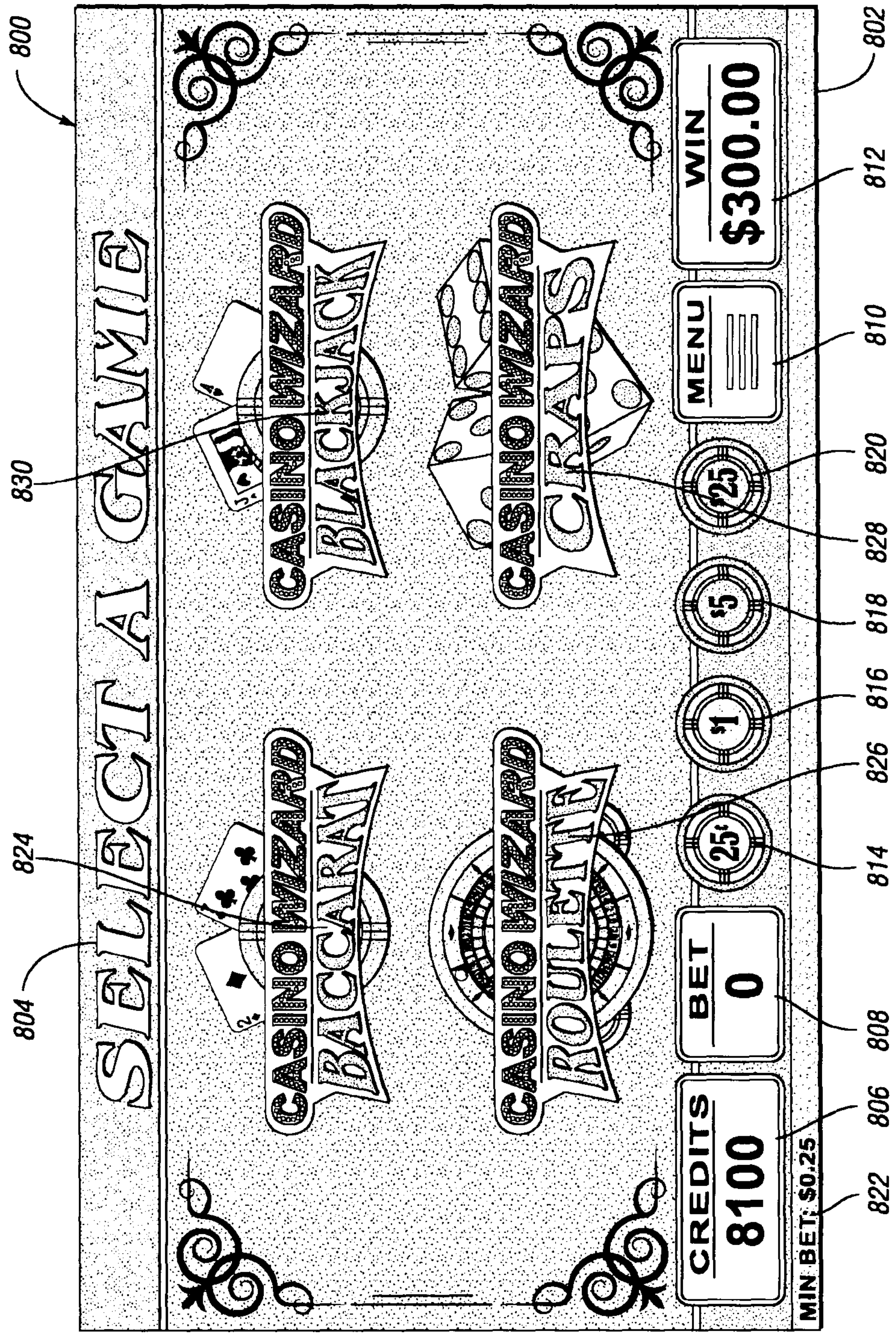
FIG. 8 illustrates a user interface presented to a player wherein the player selects one of a plurality of table games according to the embodiments of the present invention.

FIG. 8 is an illustration of one embodiment of a select screen 800 according to the embodiments of the present invention. In one embodiment, select screen 800 is comprised of a touch screen LCD display 802. Those skilled in the art will recognize that much of the functionality described in FIG. 8 through FIG. 12 may also exist on other displays, be implemented with physical buttons or the like, or any combination thereof. Moreover, while preferable, common elements may exist from table game to table game, other elements and interfaces may change, table game to table game.

Game select screen 800 is captioned "Select Game" 804 which allows a player to select one of a plurality of table games. As illustrated, a player may select from the table games of baccarat 824, blackjack 830, roulette 826 or craps 828. While these particular table games are illustrated, any number and type of table games may be offered. As discussed, certain common interface elements are included in all primary displays for convenience for the player but are not mandatory. Such elements may include a credit display 806, a bet or wager display 808, a menu button 810 and a win display 812. Additionally, wager amounts are made by utilizing the virtual chips illustrated. The casino operator may determine and set bet or wager amounts as they desire. As an example, the interface illustrates a 250 chip 814, a $1 chip 816, a $5 chip 818 and a $25 chip 820. The display 800 also indicates the minimum bet or wager 822 a player may make. As betting or wagering does not occur during the select game 804 process, this functionality is not necessary for this particular display but is necessary for actual operable game screens. Once a player selects the table game they wish to play, this display is replaced by the primary game screen relative to the selected game of choice. In an alternative embodiment, the game select screen 800 includes a shuffle input (not shown) which causes the processor of the EGM to randomly cause any of the stored virtual games to be presented to the player. Such a random selection may be made after each hand or round is played or may be made after a pre-established number of hands or rounds (e.g., five) of a selected game. In one embodiment, the player may select how many hands or rounds are played before the processor randomly selects a new game. Such an embodiment adds excitement and anticipation to the player experience. In one embodiment, the player may place a bet or wager on which game the processor will next select.

Figure 9A:
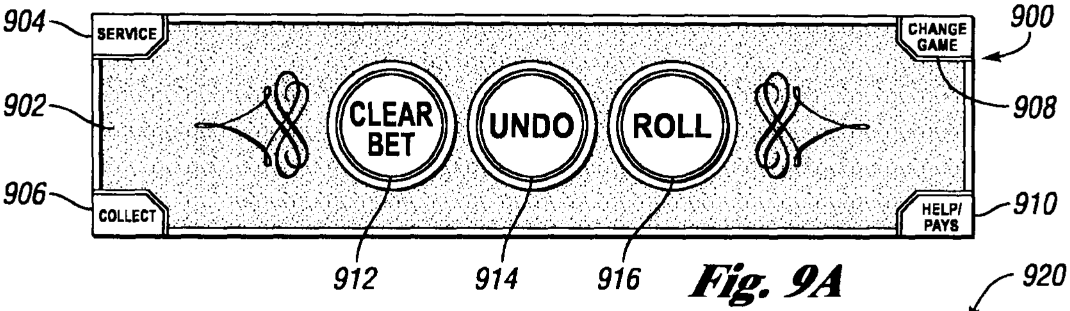
FIG. 9A illustrates a user interface of a LCD button deck of the electronic table game of craps according to the embodiments of the present invention.

FIG. 9A illustrates one embodiment of a user interface 900 of a touch screen LCD button deck 902 of the electronic table game of craps of the present invention. Although the user interface 900 is utilized for the table game of craps, it may be utilized for other table games where appropriate. A number of common elements may exist between various table game user interfaces, some elements may be common between such user interfaces. Such common elements may include a service button 904 used to alert the casino staff there may be a problem with the EGM, a collect button 906 which allows a player to collect or cash out their current credits generally by way of a printed credit voucher, a change game button 908 which allows a player to change games by toggling the display to the select screen shown in FIG. 8 or similar, and a help/pays button 910 which provides the player with game rules, game information, paytable and the like. For the particular game of craps or similar games, a plurality of buttons are displayed which allow the player to clear a bet 912, undo a previous operation 914, or initiate the craps game by touching the roll button 916.

Figure 9B:
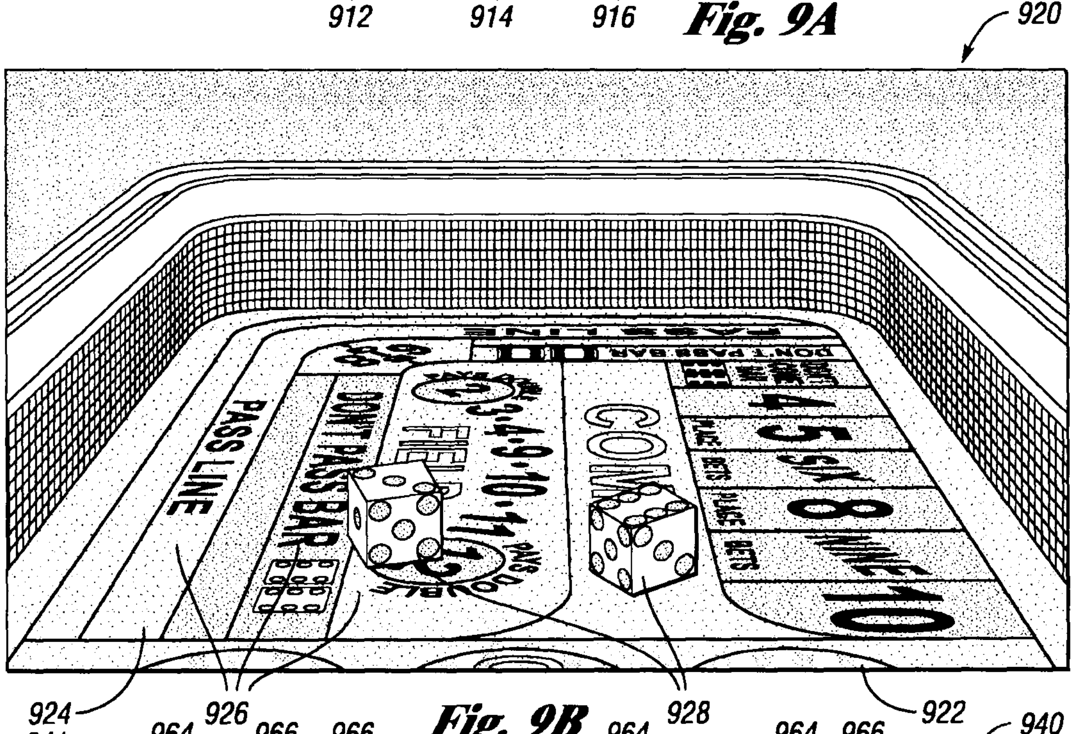
FIG. 9B illustrates the top display of an EGM relating to the electronic table game of craps according to the embodiments of the present invention.

FIG. 9B illustrates one embodiment of the top display 920 of an EGM relating to the electronic table game of craps according to the embodiments of the present invention. Those skilled in the art will recognize that any table game may be offered on a variety of display configurations including a single landscape mode display or a single portrait mode display with a separate button deck as illustrated in FIG. 9A, a single landscape mode display or a single portrait mode display with button deck functionality included in the display, dual displays as illustrated herein, dual displays with the button deck functionality included in one of the two displays, or three displays, generally with landscape orientation, with either a separate button deck or button deck functionality included within one of the three displays.

In the case of FIG. 9B, one embodiment of the top display 920 is comprised of either a touch screen display or non-touch screen display 922. Generally, the top display 922 either represents an image of the table game being played, a logo of the game being played, a virtual dealer, or other images. As illustrated, the image displayed on top display 922 is a virtual craps table layout 924 which includes a number of betting positions 926. Once the player places one or more bets or wagers, the player may initiate the games by touching the roll button 916 as shown in FIG. 9A, wherein the virtual dice 928 are thrown onto the craps table layout 924. In one embodiment, this is an animated sequence to emulate real dice where the dice travel and rotate until they eventually come to a resting position. The dice indicia, as represented by dots or pips, represent numbers which are added together to determine the total number of dots or pips on the top surface of the dice 928. As shown, the dice 928 together show a total value of 9.

Figure 9C:
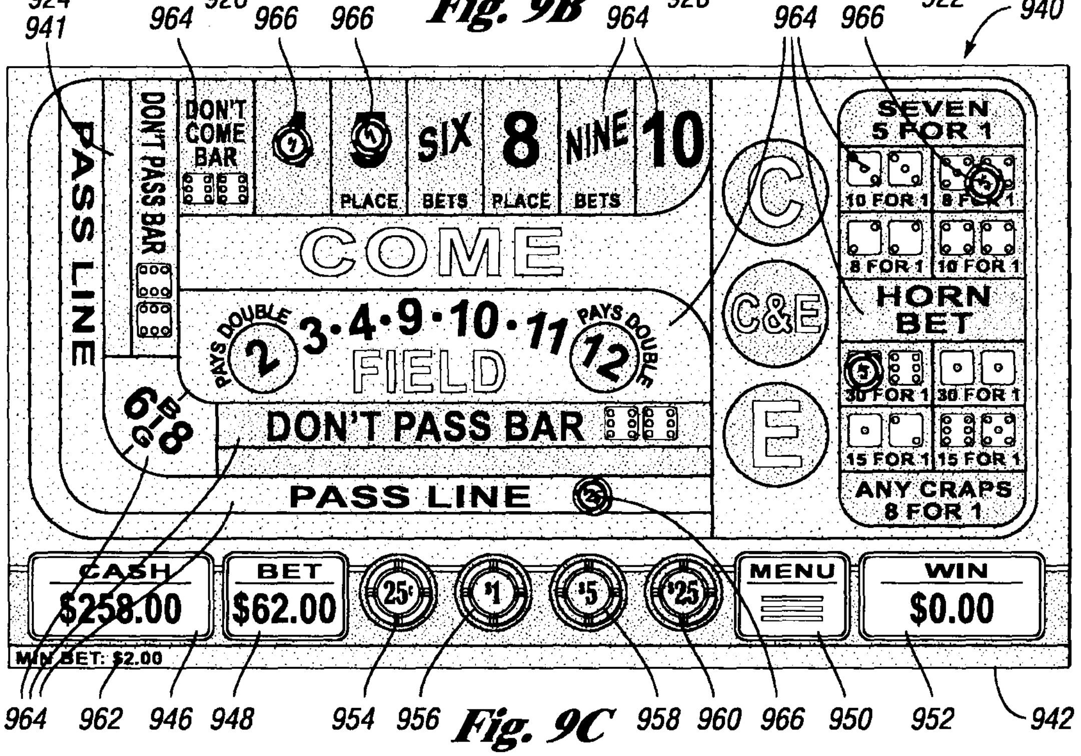
FIG. 9C illustrates the bottom display of an EGM relating to the electronic table game of craps according to the embodiments of the present invention.

FIG. 9C illustrates one embodiment of the bottom display 940 of an EGM relating to the electronic table game of craps according to the embodiments of the present invention. Bottom display 940 is comprised, in one embodiment, of a touch screen display 942 displaying a craps game layout 941. Bottom display 940 also includes a number of generally common elements which may include a credit display 946, a bet or wager display 948, a menu button 950 and a win display 952. In any table game where no decisions are required of the player, such as craps, roulette, baccarat, or similar, a repeat button may be included to allow for repeating the previous bet(s) or wager(s). The repeat button may also serve to allow for automated continual play where once a player holds the repeat bet button down for a predetermined time or similar, the electronic table game will automatically play additional games with the same betting or wagering scheme until the player again presses the play or repeat button or similar prescribed player input to end the automated session. Additionally, wager amounts are made by utilizing the virtual chips illustrated. The casino operator may determine and set bet or wager amounts as they desire. As an example, the interface illustrates a 250 chip 954, a $1 chip 956, a $5 chip 958 and a $25 chip 960. However, a particular casino operator may configure the betting range 50, 250, 500 and $1 while another operator may configure the betting range as $5, $25, $100, and $500. There are few limitations to how an operator may configure a betting range. Those skilled in the art will recognize that although four virtual chips of various denominations are illustrated, any number of virtual chips with varying denominations may be utilized. Bottom display 940 also indicates the minimum bet or wager 962 a player may make to initiate a game.

The craps layout 941 preferably includes a number of betting or wagering positions 964. Generally, the game of craps includes a great many betting or wagering positions, each offering a different type bet or wager with some offering the same payouts with some with differing payouts. The payouts generally escalate as the probability of winning decreases. In addition, after an initial roll when a player does not roll a 7 or 11 to win or 2, 3, or 12 to lose, the player will establish their point which is the total shown on the dice on the initial roll. Pass and come line bets may allow for odds bets to increase the player bet or wager and reduce the house advantage once the point is established. This betting or wagering scheme may be configurable by the operator to allow for no odds bets, 1× odds bet, 2× odds bet, 3× odds bets, etc. Generally, the maximum odds bets will be under 50× odds bets.

Figure 13:
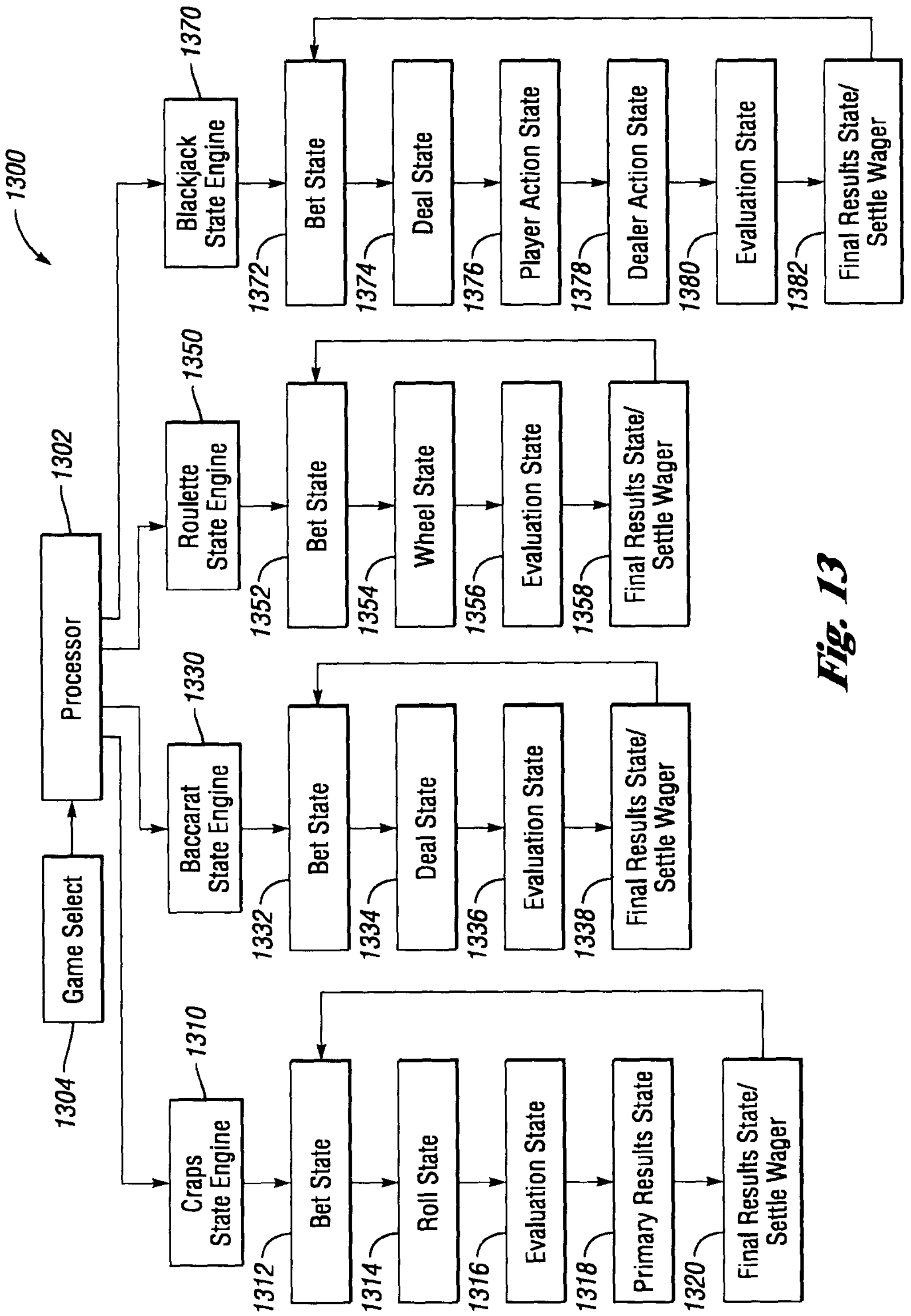
FIG. 13 illustrates a block diagram depicting discrete game engines for a plurality of electronic table games according to the embodiments of the present invention.

Initially, when a new game begins, a player places a bet or wager by using hand gestures between the virtual chips and the desired betting position 964 on the craps layout 941. For instance, a player may touch a desired chip 954, 956, 958, or 960 and slide it to the desired bet or wager position 964 or touch a desired chip 954, 956, 958, or 960 and then touch the desired betting or wagering position 964. Those skilled in the art will recognize that a variety of hand gestures may be utilized in this regard. As illustrated, a particular player has made a number of different bets or wagers as shown by virtual chips located on the craps layout 941. The bets or wagers shown include a $25 bet or wager 966 on the pass line, a $1 bet or wager 966 on the 4 and 5, a $5 bet or wager 966 on hard way 10, and a $5 bet or wager 966 on 12. An operator may configure the game to allow for either a limited number of bets or wagers or an unlimited number of bets or wagers. This may be configured as the number of bets or wagers or by setting monetary minimum and maximum bets or wagers. Any number of bets or wagers may be placed on a betting or wagering position 964. As an example, a player may place a $1 virtual chip 954 on the come line bet and then add a 250 virtual chip 954 to the come line bet, followed by a $25 virtual chip 960 and a $5 virtual chip 958 to the come line bet for a total bet or wager of $31.25. As a player places their bets or wagers, the bet or wager amount is deducted from their credit balance as shown in credit display 946. The type and number of such bet or wager placements are generally only limited by the operator's desired configuration. In the event a player places the virtual chip 954, 956, 958, or 960 on a betting or wagering position which is partially on one bet or wagering position and partially on another bet or wagering position, which may occur in a physical game, the game state engine of the particular game, as shown in FIG. 13, may automatically shift the virtual chip 954, 956, 958, or 960 to the position mostly covered by the virtual chip 954, 956, 958, or 960 to avoid any doubt of where the actual bet or wager resides.

Once a player has concluded placing their bets or wagers, the player initiates the game by touching the roll button 916 on display 900 whereas two virtual dice 928 are rolled. In one embodiment, virtual dice 928 are animated to emulate real dice and when they come to rest, the final value of the dice spots or pips shown on the top surface of the dice 928 are added together to determine the final value. Following the dice coming to rest, the processor 1302, shown in FIG. 13, determines the final results and settles all bets or wagers. The final win settlement is shown in the win display 952 and then added to the current credits as shown in display 946. In the game of craps, many bets may carry over from roll to roll if a player has not made their point for a win or rolled a 7 to end their roll session. However, when a 7 is finally rolled, generally all bets or wagers are concluded and settled with some such as come line bets or wagers winning and other bets or wagers losing.

An important feature of EGMs is the number of plays possible within a given time frame, e.g., plays per hour. For some games such as blackjack or roulette, there is slight lag between the time a player initiates the game and the conclusion of the game. However, for games which include virtual physical items to determine game outcomes such as the dice in the game of craps or the roulette wheel in the game of roulette, significant time is taken to allow for the animation of the dice coming to rest in the game of craps or the roulette wheel coming to rest and the roulette ball falling into a final position. Embodiments of the present invention allow for a player to touch either the roll button for craps or the spin button in roulette to immediately advance to the final outcome by truncating much or all of the game animation thereby speeding up the game or plays per hour by a considerable amount. Any embodiments of the present invention may similarly include such speed play functionality. In one embodiment, animation and/or speed play software modules facilitate the animation and speed play functionality.

Figure 10A:
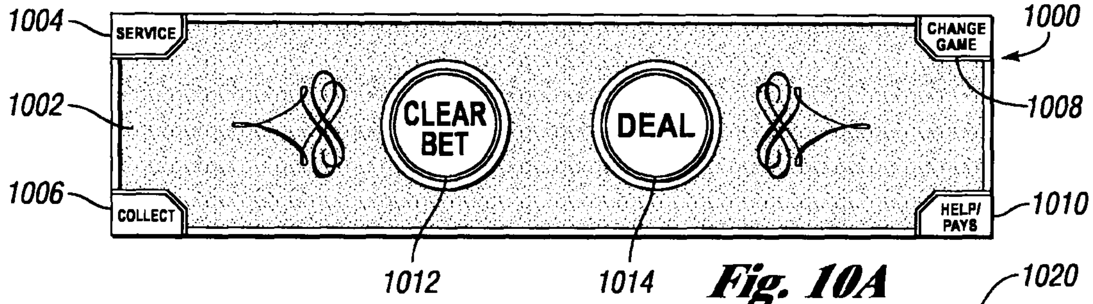
FIG. 10A illustrates a user interface of a LCD button deck of the electronic table game of baccarat according to the embodiments of the present invention.

FIG. 10A illustrates one embodiment of a user interface 1000 of a touch screen LCD button deck 1002 of the electronic table game of baccarat according to the embodiments of the present invention. Although the user interface 1000 is utilized for the table game of baccarat, it may be utilized for other table games where appropriate. A number of common elements may exist between various table game user interfaces, some elements may be common between such user interfaces. Such common elements may include a service button 1004 used to alert the casino staff there may be a problem with the EGM, a collect button 1006 which allows a player to collect or cash out their current credits generally by way of a printed credit voucher, a change game button 1008 which allows a player to change games by toggling the display to the select screen shown in FIG. 8 or similar, and a help/pays button 1010 which provides the player with game rules, game information, paytable and the like. For the particular game of baccarat or similar games, a plurality of buttons are displayed allowing the player to clear a bet 1012 or initiate the baccarat game by touching the deal button 1014.

Figure 10B:
FIG. 10B illustrates the top display of an EGM relating to the electronic table game of baccarat according to the embodiments of the present invention.

FIG. 10B illustrates one embodiment of the top display 1020 of an EGM relating to the electronic table game of baccarat according to the embodiments of the present invention. Those skilled in the art will recognize that any table game may be offered on a variety of display configurations including a single landscape mode display or a single portrait mode display with a separate button deck as illustrated in FIG. 10A, a single landscape mode display or a single portrait mode display with button deck functionality included in the display, dual displays as illustrated herein, dual displays with the button deck functionality included in one of the two displays, or three displays, generally with landscape orientation, with either a separate button deck or button deck functionality included within one of the three display.

In the case of FIG. 10B, one embodiment of the top display 1020 is comprised of either a touch screen display or non-touch screen display 1022. Generally, the top display 1020 either represents an image of the table game being played, a logo of the game being played, a virtual dealer, or other images.

Figure 10C:
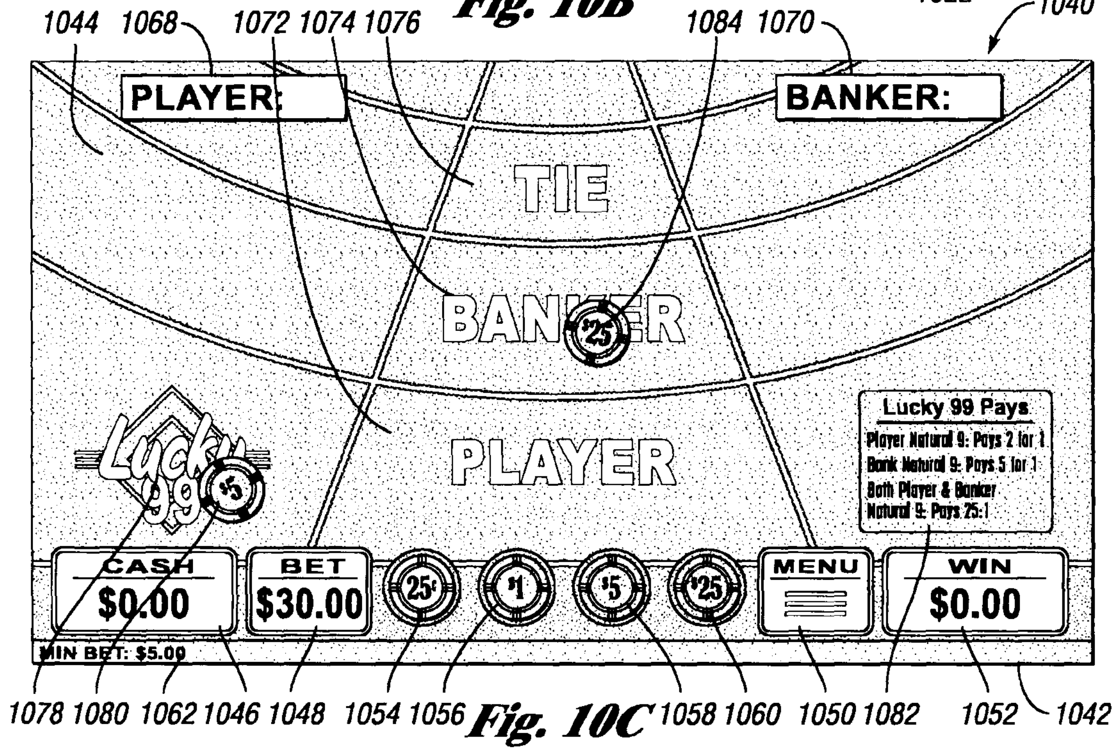
FIG. 10C illustrates the bottom display of an EGM relating to the electronic table game of baccarat according to the embodiments of the present invention.

FIG. 10C illustrates one embodiment of the bottom display 1040 of an EGM relating to the electronic table game of baccarat according to the embodiments of the present invention. In one embodiment, bottom display 1040 is comprised of a touch screen display 1042 displaying a baccarat game layout 1044. Bottom display 1040 also includes a number of generally common elements which may include a credit display 1046, a bet or wager display 1048, a menu button 1050 and a win display 1052. Additionally, wager amounts are made by utilizing the virtual chips illustrated. The casino operator may determine and set bet or wager amounts as they desire. As an example, the interface illustrates a 250 chip 1054, a $1 chip 1056, a $5 chip 1058 and a $25 chip 1060. However, a first casino operator may configure the betting range 50, 250, 500 and $1 while another operator may configure the betting range as $5, $25, $100, and $500. There are few limitations to how an operator may configure a betting range. Those skilled in the art will recognize that although four virtual chips of various denominations are illustrated, any number of virtual chips with varying denominations may be utilized. Bottom display 1040 also indicates the minimum bet or wager 1062 a player may make to initiate a game.

The baccarat game layout 1044 includes a number of betting or wagering positions 1072, 1072 and 1076. Generally, the game of baccarat includes several betting or wagering positions, each offering a different type bet or wager. In one embodiment, the baccarat game includes a side bet known as a "Lucky 99" side bet 1078. One skilled in the art will recognize many different type side bets may be added to the base baccarat game. In certain games, such as baccarat, side bets may be very important as they generally have a much higher hold percentage than the base game and generate a much higher win for the casino operator. For instance, the hold percentage of a player placing a wager on just the banker or player is slightly above 1%. However, if the player also places a bet on the "Lucky 99" side bet 1078, the hold percentage may increase to over 6%, depending on the amount of the "Lucky 99" side bet 1078. Side bets often offer higher payout multiples to attract players as shown in paytable 1082. Side bets may become of lesser importance on some table games as the games either have higher base hold percentages or offer various traditional bets with higher hold percentages, such as the game of craps.

Initially, when a new baccarat game begins, a player places a bet or wager by using hand gestures between the virtual chips and the desired betting position 1072, 1074 and 1076 on the baccarat game layout 1044. For instance, a player may touch a desired chip 1054, 1056, 1058, or 1060 and slide it to the desired bet or wager position 1072, 1072 and 1076 or touch a desired chip 1054, 1056, 1058, or 1060, lift the finger, and then touch the desired betting or wagering position 1072, 1074 and 1076. Those skilled in the art will recognize that a variety of hand gestures may be utilized in this regard. As illustrated, a player has made a number of different bets or wagers as shown by virtual chips located on the baccarat game layout 1044. The bets or wagers shown include a $25 bet or wager 1084 on the banker bet and $5 bet or wager 1080 on the "Lucky 99" side bet 1078. Generally, the game of baccarat only allows for a limited number of bets or wagers. Betting or wagering limitations may be configured as the number of bets or wagers or by setting monetary minimum and maximum bets or wagers. Any number of bets or wagers may be placed on a betting or wagering position. As an example, a player may place a $1 virtual chip 1056 on the banker bet and then add three 250 virtual chips 1054 to the banker bet, followed by two $25 virtual chips 1060 and a $5 virtual chip 1058 to the banker bet for a total bet or wager of $56.75. As a player places their bets or wagers, the bet or wager amount is deducted from their credit balance as shown in credit display 1046. The type and number of such bet or wager placements are generally only limited by the operator's desired configuration. In the event a player places the virtual chip 1054, 1056, 1058, or 1060 on a betting or wagering position which is partially on one bet or wagering position and partially on another bet or wagering position, which also occurs in a physical game, the game state engine of the particular game, as shown in FIG. 13, may shift the virtual chip 1054, 1056, 1058, or 1060 to the position mostly covered by the virtual chip 1054, 1056, 1058, or 1060 to avoid any doubt of where the actual bet or wager resides. When doing so the game state engine may also present a message on the display 1040 and/or generate an audible message to ensure that the bet or wager has been moved to the desired bet position.

Once a player has concluded placing their baccarat bets or wagers, the player initiates the game by touching the deal button 1014 on display 1002 causing two virtual hands to be dealt, one for the bank and one for the player. In one embodiment, playing cards are animated to emulate physical playing cards being dealt. When dealt, the final value of the combination of cards for both the bank and the player are determined and are displayed in either the player display window 1068 or the banker display window 1070. As dictated by the game rules, additional cards may be dealt to conclude a particular hand. Either based on the first two playing cards dealt to the banker and player or once any final playing cards are dealt to conclude a hand, the processor 1302, shown in FIG. 13, determines the final results and settles all bets or wagers. The final win settlement is shown in the win display 1052 and added to the current credits as shown in display 1046.

Figure 11A:
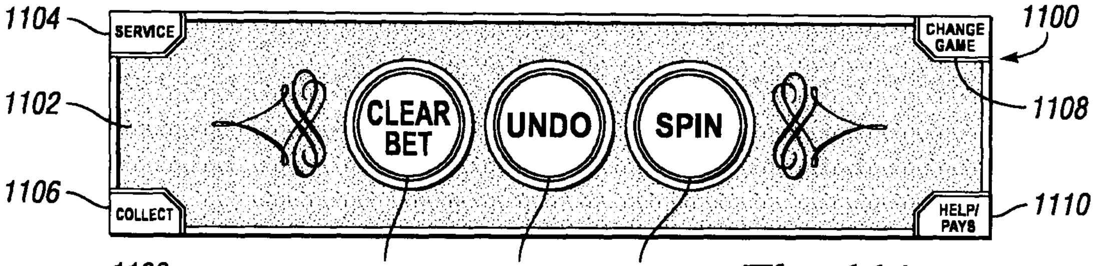
FIG. 11A illustrates a user interface of a LCD button deck of the electronic table game of roulette according to the embodiments of the present invention.

FIG. 11A illustrates one embodiment of a user interface 1100 of a touch screen LCD button deck 1102 of the electronic table game of roulette according to the embodiments of the present invention. Although the user interface 1100 is utilized for the table game of roulette, it may be utilized for other table games where appropriate. A number of common elements may exist between various table game user interfaces, some elements may be common between such user interfaces. Such common elements may include a service button 1104 used to alert the casino staff there may be a problem with the EGM, a collect button 1106 which allows a player to collect or cash out their current credits generally by way of a printed credit voucher, a change game button 1108 which allows a player to change games by toggling the display to the select screen shown in FIG. 8 or similar, and a help/pays button 1110 which provides the player with game rules, game information, paytable and the like. For the particular game of roulette or similar games, a plurality of buttons are displayed allowing the player to clear a bet 1112, undo a previous operation 1114, or initiate the roulette game by touching the spin button 1116.

Figure 11B:
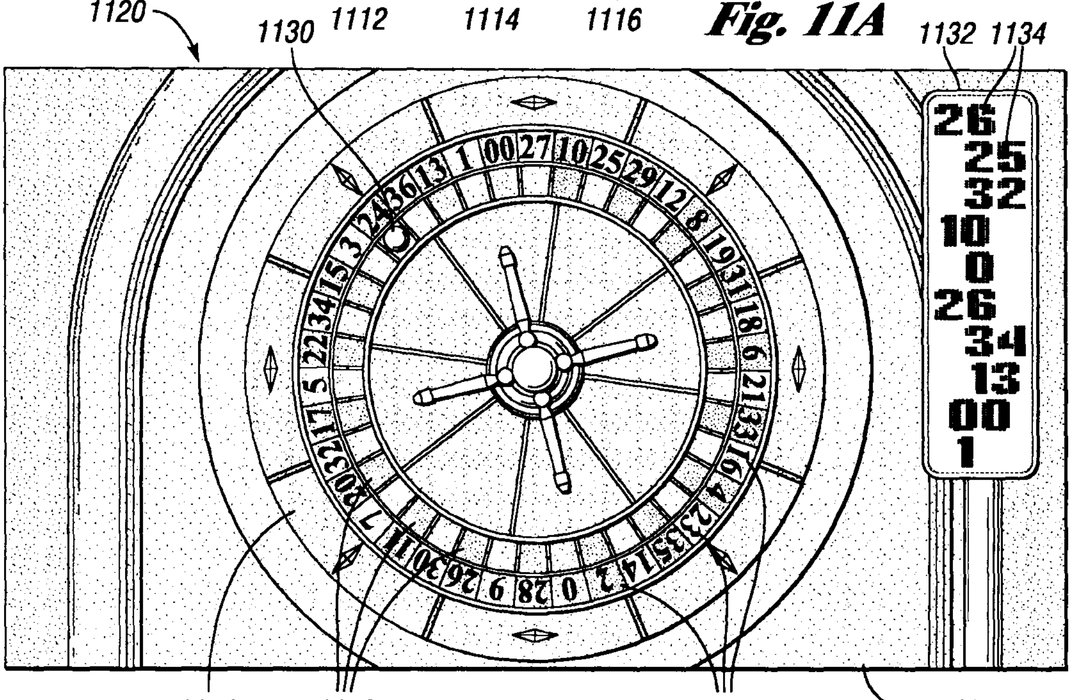
FIG. 11B illustrates the top display of an EGM relating to the electronic table game of roulette according to the embodiments of the present invention.

FIG. 11B illustrates one embodiment of the top display 1120 of an EGM relating to the electronic table game of roulette according to the embodiments of the present invention. Those skilled in the art will recognize that any table game may be offered on a variety of display configurations including a single landscape mode display or a single portrait mode display with a separate button deck as illustrated in FIG. 11A, a single landscape mode display or a single portrait mode display with button deck functionality included in the display, dual displays as illustrated herein, dual displays with the button deck functionality included in one of the two displays, or three displays, generally with landscape orientation, with either a separate button deck or button deck functionality included within one of the three displays.

In the case of FIG. 11B, one embodiment of the top display 1120 is comprised of either a touch screen display or non-touch screen display 1122. Generally, the top display 1122 either represents an image of the table game being played, a logo of the game being played, a virtual dealer, or other images. As illustrated, the image displayed on top display 1122 is a virtual roulette table layout 1144 which includes a number of betting positions 1126. Once the player places one or more bets or wagers, the player may initiate the games by touching the spin button 1116 as shown in FIG. 11A causing the virtual roulette wheel 1124 to spin as the roulette ball also spins and/or bounces from one ending location 1128 to another ending location 1228. As the virtual roulette wheel 1124 slows down, the roulette ball eventually comes to a final resting position in one of the virtual recesses 1128 which are associated with the final virtual wheel number 1126. As shown, the roulette wheel 1124 includes 36 numbers along with zero and double zero positions. However, casino operators may configure the virtual roulette wheel 1124 to allow for a single zero position, the zero and double zero positions as shown, single, double, and triple zero positions, or single, double, triple and quadruple zero positions. As the number of zero positions changes, it has a dramatic effect on hold percentage of the game. For instance, a single zero roulette game has a hold percentage of 2.70%, a double zero wheel has a hold percentage of 5.26%, and a triple zero wheel has a hold percentage of 7.69%. The roulette layout 1124 also includes a spin outcome history display 1132 which lists previous spin outcomes 1134. The positioning of the outcomes on the left, center, or right may indicate red number on the left, green or zeros in the center and black numbers on the right. Those skilled in the art will recognize many differing positions may be implemented.

In one embodiment, the roulette wheel spin is an animated sequence emulating real roulette wheels where the roulette wheel 1124 rotates with diminishing speed, eventually coming to a resting position while the roulette ball 1130 also spins and/or bounces around the virtual roulette wheel 1124 wherein the roulette ball 1130 eventually comes to a final resting position in one of the virtual recesses 1128 which are associated with the final virtual wheel number 1126.

Figure 11C:
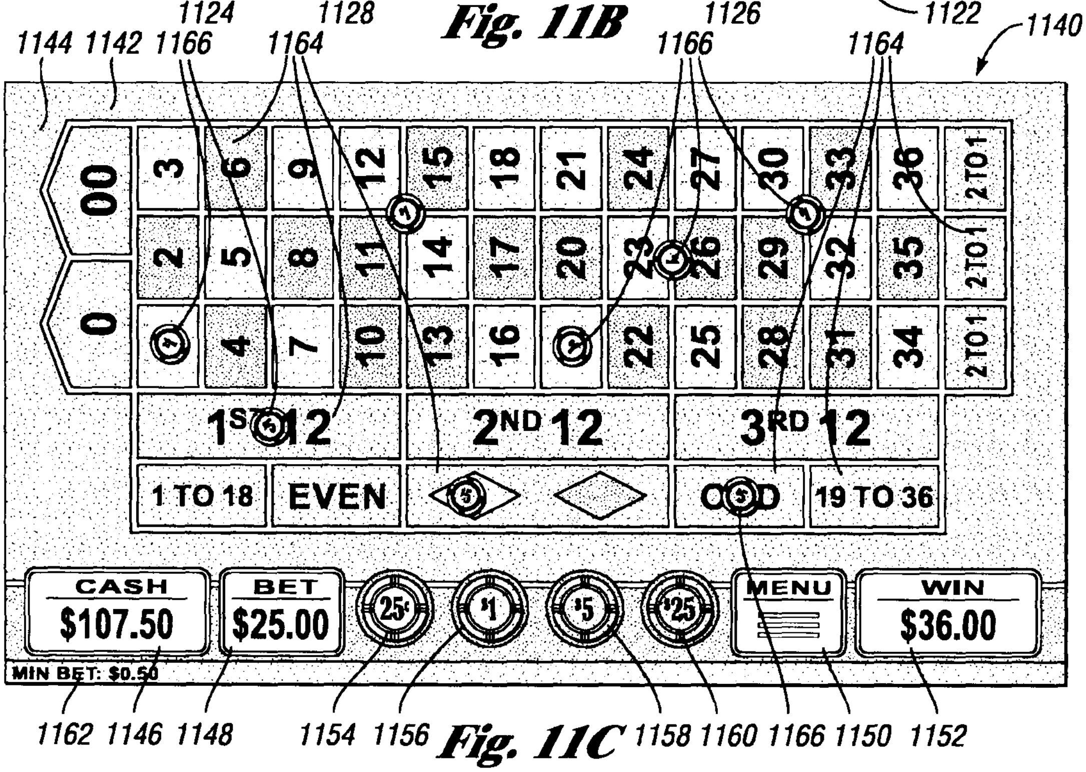
FIG. 11C illustrates the bottom display of an EGM relating to the electronic table game of roulette according to the embodiments of the present invention.

FIG. 11C illustrates one embodiment of the bottom display 1140 of an EGM relating to the electronic table game of roulette according to the embodiments of the present invention. In one embodiment, bottom display 1140 is comprised of a touch screen display 1142 displaying a roulette game layout 1144. Bottom display 1140 also includes a number of generally common elements which may include a credit display 1146, a bet or wager display 1148, a menu button 1150 and a win display 1152. Additionally, wager amounts are made by utilizing the virtual chips illustrated. The casino operator may determine and set bet or wager amounts as they desire. As an example, the interface illustrates a 25¢ chip 1154, a $1 chip 1156, a $5 chip 1158 and a $25 chip 1160. However, a first casino operator may configure the betting range 5¢, 25¢, 50¢ and $1 while another operator may configure the betting range as $5, $25, $100, and $500. There are few limitations to how an operator may configure a betting range. Those skilled in the art will recognize that although four virtual chips of various denominations are illustrated, any number of virtual chips with varying denominations may be utilized. Bottom display 1140 also indicates the minimum bet or wager 1162 a player may make to initiate a game.

In one embodiment, the roulette layout 1144 includes a number of betting or wagering positions 1164. Generally, the game of roulette includes a great many betting or wagering positions, each offering a different type bet or wager with some offering the same payouts with some with differing payouts. The payouts generally escalate as the probability of winning decreases.

Initially, when a new roulette game begins, a player places a bet or wager by using hand gestures between the virtual chips and the desired betting position 1164 on the roulette game layout 1144. For instance, a player may touch a desired chip 1154, 1156, 1158, or 1160 and slide it to the desired bet or wager position 1164 or touch a desired chip 1154, 1156, 1158, or 1160, lift the finger, and touch the desired betting or wagering position 1164. Those skilled in the art will recognize that a variety of hand gestures may be utilized in this regard. As illustrated, a player has made a number of different bets or wagers as shown by virtual chips located on the roulette game layout 1144. The bets or wagers shown include a $5 bet or wager 1166 on the first 12 bet, a $5 bet on the red color bet 1166, $5 on the odd bet 1166 along with a number of $1 bets 1166 on the number bets. An operator may configure the game to allow for either a limited number of bets or wagers or an unlimited number of bets or wagers. This may be configured as the number of bets or wagers or by setting monetary minimum and maximum bets or wagers. Any number of bets or wagers may be placed on a betting or wagering position 1164. As an example, a player may place a $1 virtual chip 1156 on red, then add two 25¢ virtual chip 1154 to the red bet, followed by a $25 virtual chip 1160 and two $5 virtual chip 1158 to the red bet for a total bet or wager of $36.50. As a player places their bets or wagers, the bet or wager amount is deducted from their credit balance as shown in credit display 1146. The type and number of such bet or wager placements are generally only limited by the operator's desired configuration. In the event a player places the virtual chip 1154, 1156, 1158, or 1160 on a betting or wagering position which is partially on one bet or wagering position and partially on another bet or wagering position, which may also occur in a physical game, the game state engine of the particular game, as shown in FIG. 13, may shift the virtual chip 1154, 1156, 1158, or 1160 to the position mostly covered by the virtual chip 1154, 1156, 1158, or 1160 to avoid any doubt of where the actual bet or wager resides. However, in the game of roulette, some wagers are intended to cover multiple bet positions and are thus accepted on such occasions.

Once a player has concluded placing their bets or wagers, the player initiates the roulette game by touching the spin button 1116 on display 1100 causing the virtual roulette wheel 1124 to begin to spin. Following the virtual roulette wheel 1124 and roulette ball 1130 coming to rest, the processor 1302, shown in FIG. 13, determines the final results and settles all bets or wagers. The final win settlement is shown in the win display 1152 and then added to the current credits as shown in display 1146.

An important feature of EGMs is the number of plays possible within a given time frame, e.g., plays per hour. For some ETG games such as blackjack or roulette, there is slight lag between the time a player initiates the game and the conclusion of the game. However, for games which include virtual physical items to determine game outcomes such as the dice in the game of craps or the roulette wheel in the game of roulette, significant time is taken to allow for the animation of the dice coming to rest in the game of craps or the roulette wheel coming to rest and the roulette ball falling into a final position. Embodiments of the present invention allow for a player to touch either the roll button for craps or the spin button in roulette to immediately advance to the final outcome by truncating much or all of the game animation thereby speeding up the game or plays per hour by a considerable amount. Any embodiments of the present invention may similarly include such speed play functionality. In addition, any embodiments of the present invention may include play speed functionality which enables the player to adjust the speed of play of a particular game, i.e., the player can adjust the total time the animated dice roll in craps, adjust the total time a roulette wheel spins until the roulette ball comes to rest in the game of roulette, adjust the time required to deal a hand of blackjack, adjust the time required to deal baccarat, or similar. Play speed having a different functionality than speed play. The operator may also configure the game to automatically play without the animation thereby speeding up the game.

Figure 12A:
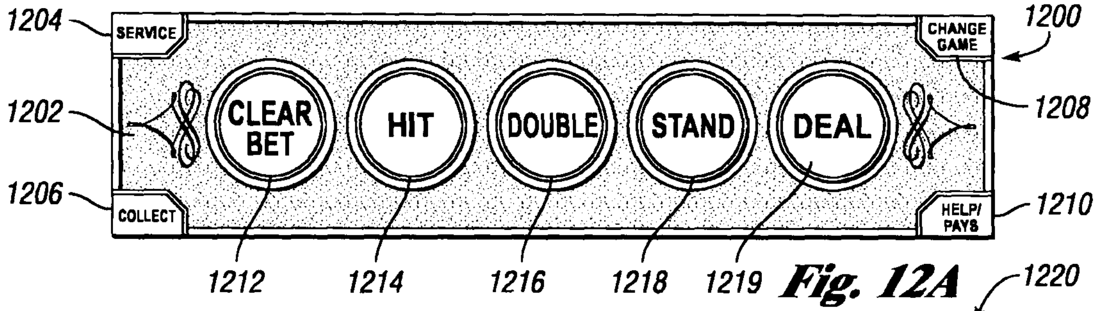
FIG. 12A illustrates a user interface of a LCD button deck of the electronic table game of blackjack according to the embodiments of the present invention.

FIG. 12A illustrates one embodiment of a user interface 1200 of a touch screen LCD button deck 1202 of the electronic table game of blackjack according to the embodiments of the present invention. Although the user interface 1200 is utilized for the table game of blackjack, it may be utilized for other table games where appropriate. A number of common elements may exist between various table game user interfaces, some elements may be common between such user interfaces. Such common elements may include a service button 1204 used to alert the casino staff there may be a problem with the EGM, a collect button 1206 which allows a player to collect or cash out their current credits generally by way of a printed credit voucher, a change game button 1208 which allows a player to change games by toggling the display to the select screen shown in FIG. 8 or similar, and a help/pays button 1210 which provides the player with game rules, game information, paytable and the like. For the particular game of blackjack or similar games, a plurality of buttons are displayed which allow the player to clear a bet 1212, receive another card via the hit button 1214, double their bet button 1216, stand button 1218, and deal button 1219 to initiate the dealing of a blackjack hand. Buttons may also offer dual functionality such as changing to a split button in the event both of the player's cards are the same, e.g., two sevens, two nines, two queens, etc., regardless of suit.

Figure 12B:
FIG. 12B illustrates the top display of an EGM relating to the electronic table game of blackjack according to the embodiments of the present invention.

FIG. 12B illustrates one embodiment of the top display 1220 of an EGM relating to the electronic table game ETG of blackjack according to the embodiments of the present invention. Those skilled in the art will recognize that any table game may be offered on a variety of display configurations including a single landscape mode display or a single portrait mode display with a separate button deck as illustrated in FIG. 12A, a single landscape mode display or a single portrait mode display with button deck functionality included in the display, dual displays as illustrated herein, dual displays with the button deck functionality included in one of the two displays, or three displays, generally with landscape orientation, with either a separate button deck or button deck functionality included within one of the three display.

In the case of FIG. 12B, one embodiment of the top display 1220 is comprised of either a touch screen display or non-touch screen display 1222. Generally, the top display 1222 either represents an image of the table game being played, a logo of the game being played, a virtual dealer, or other images.

Figure 12C:
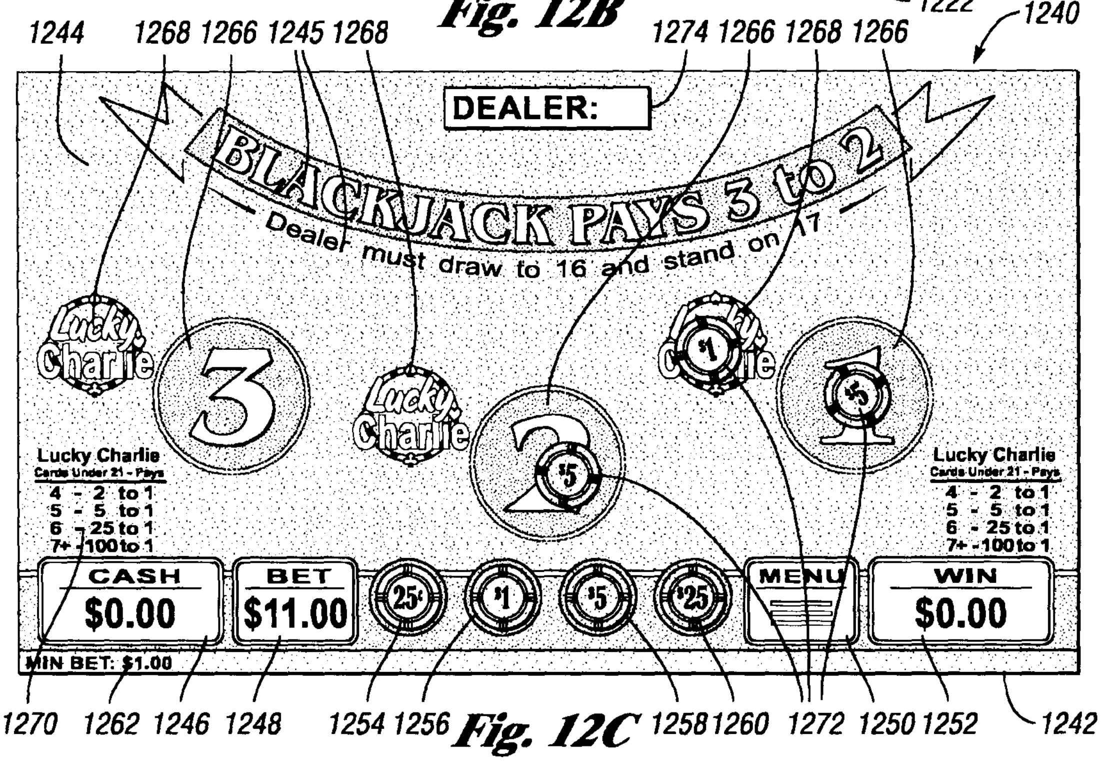
FIG. 12C illustrates the bottom display of an EGM relating to the electronic table game of blackjack according to the embodiments of the present invention.

FIG. 12C illustrates one embodiment of the bottom display 1240 of an EGM relating to the electronic table game of blackjack according to the embodiments of the present invention. In one embodiment, bottom display 1240 is comprised of a touch screen display 1242 displaying a baccarat game layout 1244. Bottom display 1240 also includes a number of generally common elements which may include a credit display 1246, a bet or wager display 1248, a menu button 1250 and a win display 1252. Additionally, wager amounts are made by utilizing the virtual chips illustrated. The casino operator may determine and set bet or wager amounts as they desire. As an example, the interface illustrates a 250 chip 1254, a $1 chip 1256, a $5 chip 1258 and a $25 chip 1260. However, a particular casino operator may configure the betting range 50, 250, 500 and $1 while another operator may configure the betting range as $5, $25, $100, and $500. There are few limitations to how an operator may configure a betting range. Those skilled in the art will recognize that although four virtual chips of various denominations are illustrated, any number of virtual chips with varying denominations may be utilized. Bottom display 1240 also indicates the minimum bet or wager 1262 a player may make to initiate a game.

In one embodiment, the blackjack layout 1244 includes a number of betting or wagering positions player spot 1, player spot 2, or player spot 3 1266, each offering a different hand for the player. In one embodiment, the blackjack game includes a side bet known as a "Lucky Charlie" side bet 1268. One skilled in the art will recognize many different type side bets may be added to the base blackjack game. In certain games, such as blackjack, side bets may be very important as they generally have a much higher hold percentage than the base game and generate a much higher win for the casino operator. For instance, the hold percentage of blackjack may be slightly above 1%, depending on the game rules and the player's skill. However, if the player also places a bet on the "Lucky Charlie" side bet 1268, the hold percentage may increase to over 6%, depending on the amount of the "Lucky Charlie" side bet 1268. Side bets often offer higher payout multiples to attract players as shown in paytable 1270. Side bets may become of lesser importance on some table games as the games either have higher base hold percentages or offer various traditional bets with higher hold percentages, such as the game of craps.

Initially, when a new blackjack game begins, a player places a bet or wager by using hand gestures between the virtual chips and the desired betting position 1272 on the blackjack layout 1244. For instance, a player may touch a desired chip 1254, 1256, 1258, or 1260 and slide it to the desired bet or wager position 1272 or touch a desired chip 1254, 1256, 1258, or 1260, lift the finger, and then touch the desired betting or wagering position 1272. Those skilled in the art will recognize that a variety of hand gestures may be utilized in this regard. As illustrated, a particular player has made a number of different bets or wagers as shown by virtual chips located on the blackjack layout 1244. The bets or wagers shown include $5 bets or wagers 1272 on player positions 1 and 2 and $1 bet or wager 1272 on the "Lucky Charlie" side bet 1268. Generally, the game of blackjack only allows for a limited number of bets or wagers. Betting or wagering limitations may be configured as the number of bets or wagers or by setting monetary minimum and maximum bets or wagers. Any number of bets or wagers may be placed on a betting or wagering position 1266. As a player places their bets or wagers, the bet or wager amount is deducted from their credit balance as shown in credit display 1248. The type and number of such bet or wager placements are generally only limited by the operator's desired configuration. In the event a player places the virtual chip 1254, 1256, 1258, or 1260 on a betting or wagering position which is partially on one bet or wagering position and partially on a non-betting or wagering position, which may also occur in a physical game, the game state engine of the particular game, as shown in FIG. 13, may shift the virtual chip 1254, 1256, 1258, or 1260 to the position closest to the virtual chip 1254, 1256, 1258, or 1260 to avoid any doubt of where the actual bet or wager resides.

Once a player has concluded placing their bets or wagers, the player initiates the blackjack game by touching the deal button 1219 on display 1202 causing one or more virtual hands to be dealt for the player and one for the dealer. In one embodiment, playing cards are animated to emulate playing cards being dealt in a real blackjack game and when dealt, one of the dealer's two cards are shown while the other card remains hidden (i.e., face down). The dealer's current hand total (excluding the face down card) may be displayed in dealer display window 1274. As dictated by the game rules, additional cards may be dealt to the player upon request by the player touching the hit button 1214, the double button 1216, or the when both initial cards match, touching a split button (not shown) to divide the hand into two hands, both with the original bet or wager amount. In the alternative, the player may choose to stand by touching the stand button 1218 at any time. If the player's hand total exceeds 21, the hand ends immediately. If the player's first two cards are any ace with any card with a value of 10, the hand may end with an immediate payout of 3 to 2 or if enabled, the game may ask the player for "insurance" if the dealer's face up card is also an ace. Although the blackjack payout is listed as 3 to 2, the game is configurable to provide other payouts such as 6 to 5 or even money, as an example. Once a player has concluded their play without "busting" or exceeding a total hand value of 21 or less, the player may touch the stand button 1218. If the player has placed a bet or wager on additional gaming positions 2 or 3 to form two or three total hands, the player sequentially concludes each additional hand by either "busting" or touching the stand button 1218. If one or more of the player's hands are still in play without "busting," the dealer plays out their hand. The dealer's options are limited as the dealer is required to "draw to 16 and stand on 17 or above." In the event the dealer receives an ace as their up card, the game may either offer insurance or reveal a blackjack, if one has occurred. Once a hand is concluded, the processor 1302, shown in FIG. 13, determines the final results and settles all bets or wagers. The final win settlement is shown in the win display 1252 and then added to the current credits as shown in display 1246.

Those skilled in the art will recognize that although the embodiments illustrated in FIGS. 9 through 12 are shown with dual landscape-oriented displays, they may be combined into a single portrait-oriented display.

FIG. 13 illustrates a block diagram 1300 depicting discrete game engines for a plurality of electronic table games according to the embodiments of the present invention which includes a processor 1302. Most game processing on EGMs includes one and only one game state engine as that is all that is required for game operation. This includes a great many multi-play EGMs games. However, due to the many complexities of table games, the vast differences in rules and game play, and the potentially many configurability options, embodiments of the present invention allow for separate and discrete game engines for each game or group of games.

Initially, a player is presented with a game select screen similar to that illustrated in FIG. 8. This step is shown in FIG. 13 as the game select step 1304. Once the game is selected, the processor 1302 determines which game state engine to utilize generally corresponding to the particular game the player has selected. Although FIG. 13 illustrates the four games of craps, baccarat, roulette and blackjack, any number or types of table games may be included. For instance, the games depicted on the display may include a plurality of table games such as Craps, Baccarat, Roulette, Blackjack, Three-Card Poker, Pai Gow Poker, Caribbean Stud, Big 6, Keno, Bingo, Super Fun 21, Royal Match Blackjack, and the like.

As illustrated in FIG. 13, once a player has selected their game, the processor 1302 will route the play to the appropriate game state engine. The game state engines may also include or communicate with a database maintaining math models for each game and any side bets associated therewith. In the event the game selected is craps, the processor routes the play to the craps game state engine 1310 which processes the play in discrete steps with the first state being the bet state 1312. Once the bet state is concluded, the roll state 1314 processes the rolling of the dice. Once concluded, the processor 1302 enters the evaluation state 1316 and once concluded moves to the primary results state 1318 and finally to the final results state 1320.

In the event the game selected is baccarat, the processor 1302 routes the play to the baccarat game state engine 1330 which processes the play in discrete steps with the first state being the bet state 1332. Once the bet state is concluded, the deal state 1334 processes the dealing of playing cards. Once concluded, the processor 1302 enters the evaluation state 1336 and once concluded, moves to the final results state/settle wager step 1338 and play is concluded.

In the event the game selected is roulette, the processor 1302 routes the play to the roulette game state engine 1350 which processes the play in discrete steps with the first state being the bet state 1352. Once the bet state is concluded, the wheel state 1354 processes the roulette wheel operation. Once concluded, the processor 1302 enters the evaluation state 1356 and once concluded moves to the final results state/settle wager step 1358 and play is concluded.

In the event the game selected is blackjack, the processor 1302 routes the play to the blackjack game state engine 1370 which processes the play in discrete steps with the first state being the bet state 1372. Once the bet state is concluded, the deal state 1374 processes the dealing operation. Once concluded, the processor 1302 enters the player action state 1376 which determines what player actions have occurred and then enters the dealer action state 1378. Once the player action state 1376 and dealer action state 1378 have concluded, processing enters the evaluation state 1380 and once concluded moves to the final results state/settle wager step 1382 and play is concluded.

Figure 14:
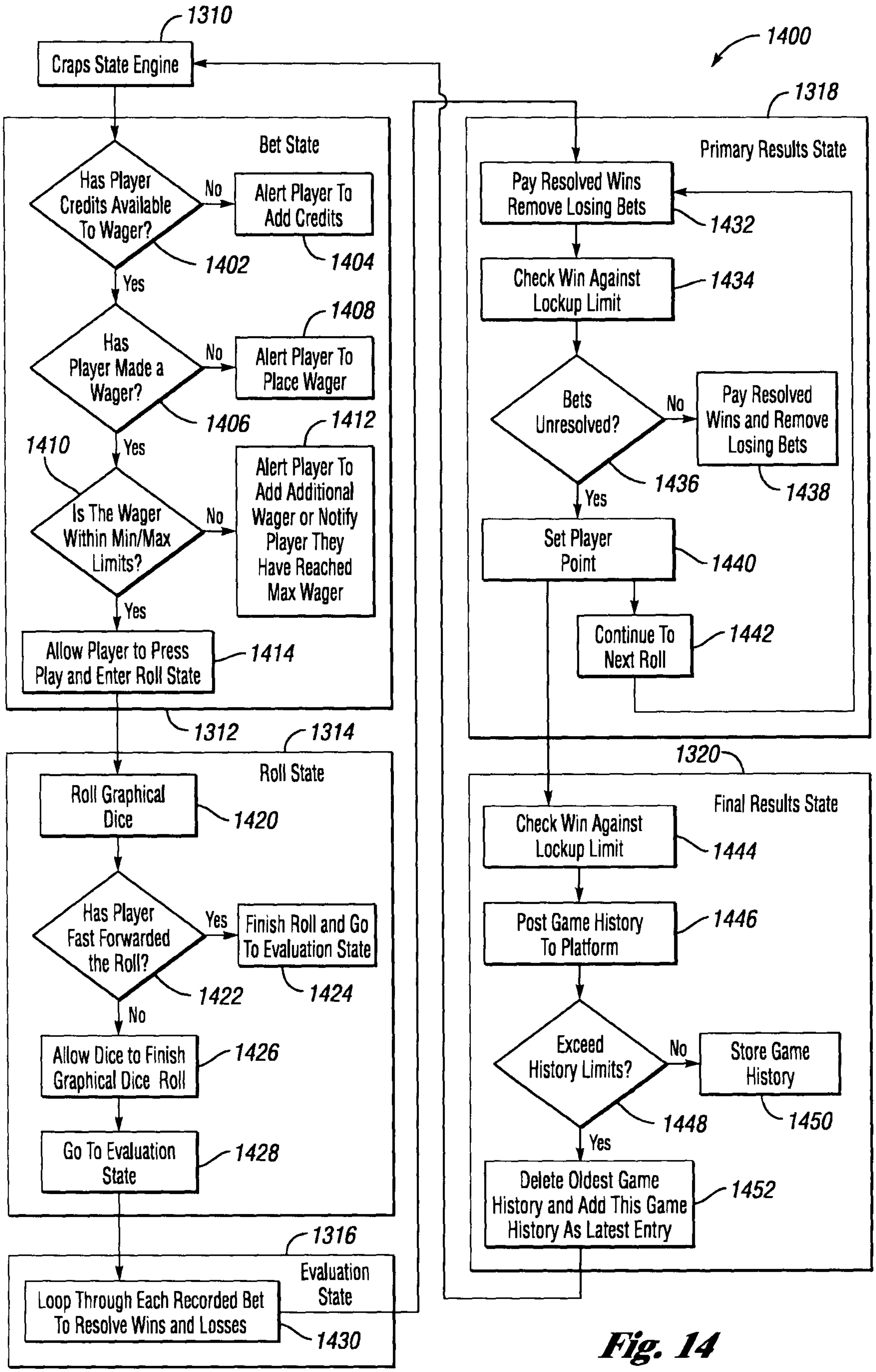
FIG. 14 illustrates an expanded block diagram of the craps game engine of FIG. 13 for electronic table games of the present invention.

FIG. 14 illustrates an expanded block diagram of the craps game engine 1310 of FIG. 13 for electronic table games according to the embodiments of the present invention. The craps state engine 1310 is included within the complete craps processing 1400. Once a player has selected the game of craps from the plurality of games offered, the game enters the bet state 1312 wherein the processor determines if the player has enough credits 1402 to meet the game's minimum bet or wager configuration. In the event credits are insufficient to meet the minimum bet or wager, the player is alerted 1404 to add credits to meet the minimum bet or wager configuration. If the player has sufficient credits to place a bet or wager, the player may continue the game and place a bet or wager. If the player does not place a bet or wager, as determined in decision block 1406, the player is alerted to place a bet or wager 1408. If the player has placed a bet or wager the processor determines if the bet or wager is within the minimum and maximum limits 1410. If the bet or wager is outside of the minimum and maximum limits, the player is notified to either add additional bet or wager or they have reached the games maximum limit 1412. If the bet or wager is within minimum and maximum limits 1410, the player is allowed to press the play button to start the game.

Once the player presses the play button, the game processing enters the bet state 1314 and begins with the roll of the virtual or graphical dice. If the player has pressed the speed play button 1422, the virtual dice immediately come to rest at 1424. If not, the virtual dice and animated and simulate a dice roll and eventually come to a final resting position 1426. Once the simulated virtual dice roll comes to a final resting position, the processor instructs the game to go to the evaluation state 1316. Once entering the evaluation state 1316, the processor loops through each recorded bet or wager to resolve wins and losses 1430.

Once wins and losses are resolved 1430 the game enters the primary results state 1318. Once in the primary results state 1318 resolves bets or wagers, winning bets or wagers are paid or losing bets or wagers removed 1432. Once resolved, check win against lockup amount limit occurs 1434. Following this occurrence, a determination is made if there are any bets unresolved 1436. If no unresolved bets remain, the player is either paid for winning bets or wagers or losing bets or wagers are removed 1438. If unresolved bets or wagers remain, a point is set wherein the game continues to the next roll 1442. A similar scenario or sequence of events occurs for come line bets.

Once primary results state 1318 concludes, the processor enters the final results state 1320. Initially, the processor checks win against lockup amount limit 1444. Thereafter, the game history is posted to the platform 1446 as is required in most gaming jurisdictions. Not every game ever played is required to reside in the game history. Instead, only a predetermined number of games or actions need be posted for a later recall to check the game history. As a limited number of games or actions need be recorded, a game history limit is established, e.g., last 25 games, last 50 games, last 100 games, etc. A determination is made if the current game history, when added to the previously posted games exceed the history limits 1448. If not, the game history is recorded and posted 1450. If the game history exceeds the limits, the oldest posted game or actions are deleted and the current posted game is added to the history as the most recent game or action 1452. At this point, the processor causes the entire process 1400 to begin again for the next game to be played.

Figure 15:
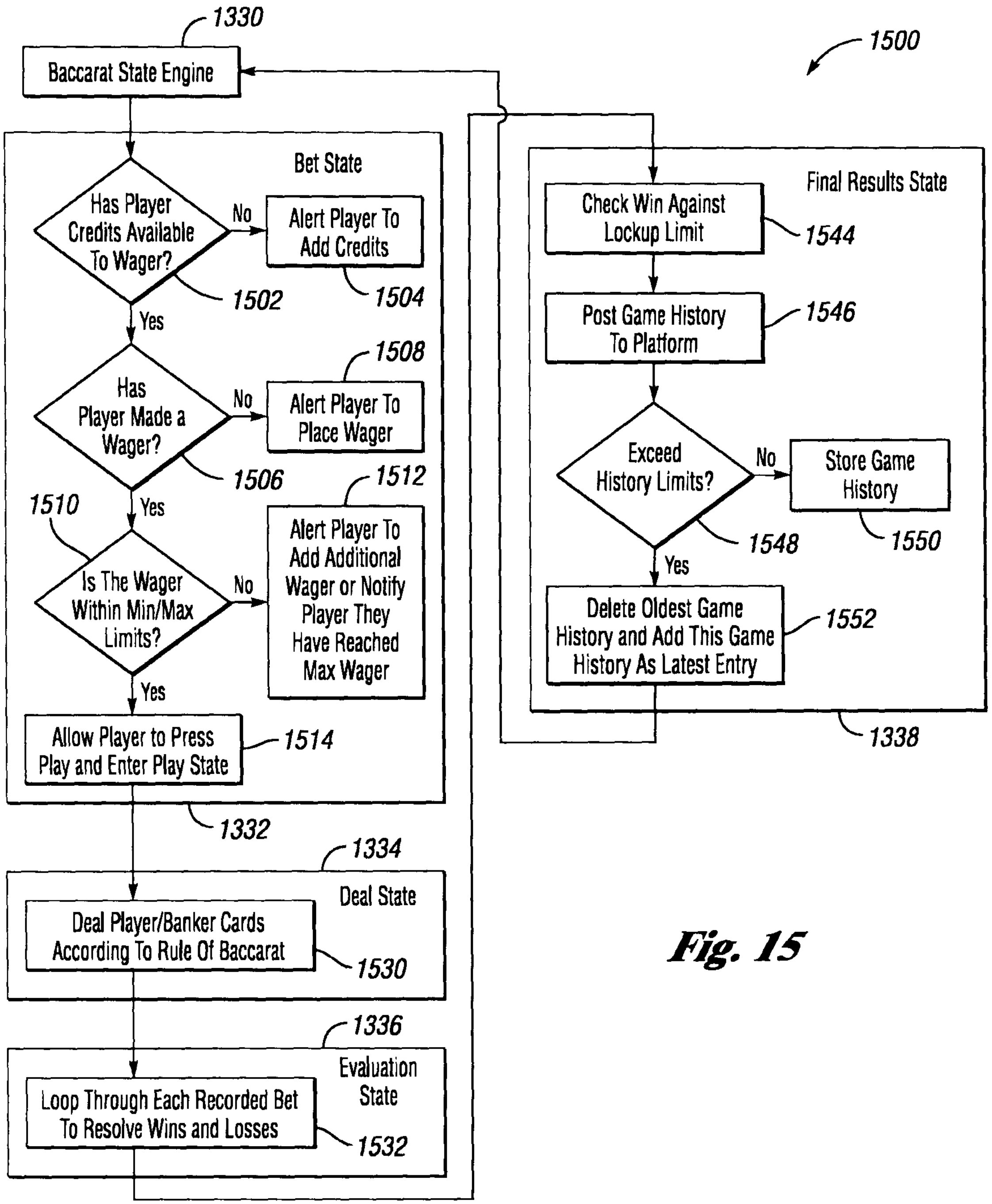
FIG. 15 illustrates an expanded block diagram of the baccarat game engine of FIG. 13 for electronic table games of the present invention.

FIG. 15 illustrates an expanded block diagram 1500 of the baccarat game engine of FIG. 13 for electronic table games according to the of the present invention. The baccarat state engine 1330 is included within the complete baccarat processing 1500. Once a player has selected the game of baccarat from the plurality of games offered, the game enters the bet state 1332 wherein the processor determines if the player has enough credits 1502 to meet the game's minimum bet or wager configuration. In the event credits are insufficient to meet the minimum bet or wager, the player is alerted 1504 to add credits to meet the minimum bet or wager configuration. If the player has sufficient credits to place a bet or wager, the player may continue the game and place a bet or wager. If the player does not place a bet or wager, as determined in decision block 1506, the player is alerted to place a bet or wager 1508. If the player has placed a bet or wager the processor determines if the bet or wager is within the minimum and maximum limits 1510. If the bet or wager is outside of the minimum and maximum limits, the player is notified to either add additional bet or wager or they have reached the games maximum limit 1512. If the bet or wager is within minimum and maximum limits 1510, the player is allowed to press the play button to start the game 1514.

Once the player presses the play button, the game processing then enters the deal state 1334 and player and banker cards are dealt 1530. The game then enters the evaluation state 1336, the processor loops through each recorded bet or wager to resolve wins and losses 1532.

Once evaluation state 1336 concludes, the processor enters the final results state 1338. Initially, the processor checks win against lockup amount limit 1544. Thereafter, the game history is posted to the platform 1546 as is required in most gaming jurisdictions. Not every game ever played is required to reside in the game history. Instead, only a predetermined number of games or actions need be posted for a later recall to check the game history. As a limited number of games or actions need be recorded, a game history limit is established, e.g., last 25 games, last 50 games, last 100 games, etc. A determination is made if the current game history, when added to the previously posted games exceed the history limits 1548. If not, the game history is recorded and posted 1550. If the game history exceeds the limits, the oldest posted game or actions are deleted and the current posted game is added to the history as the most recent game or action 1552. At this point, the processor causes the entire process 1500 to begin again for the next game to be played.

Figure 16:
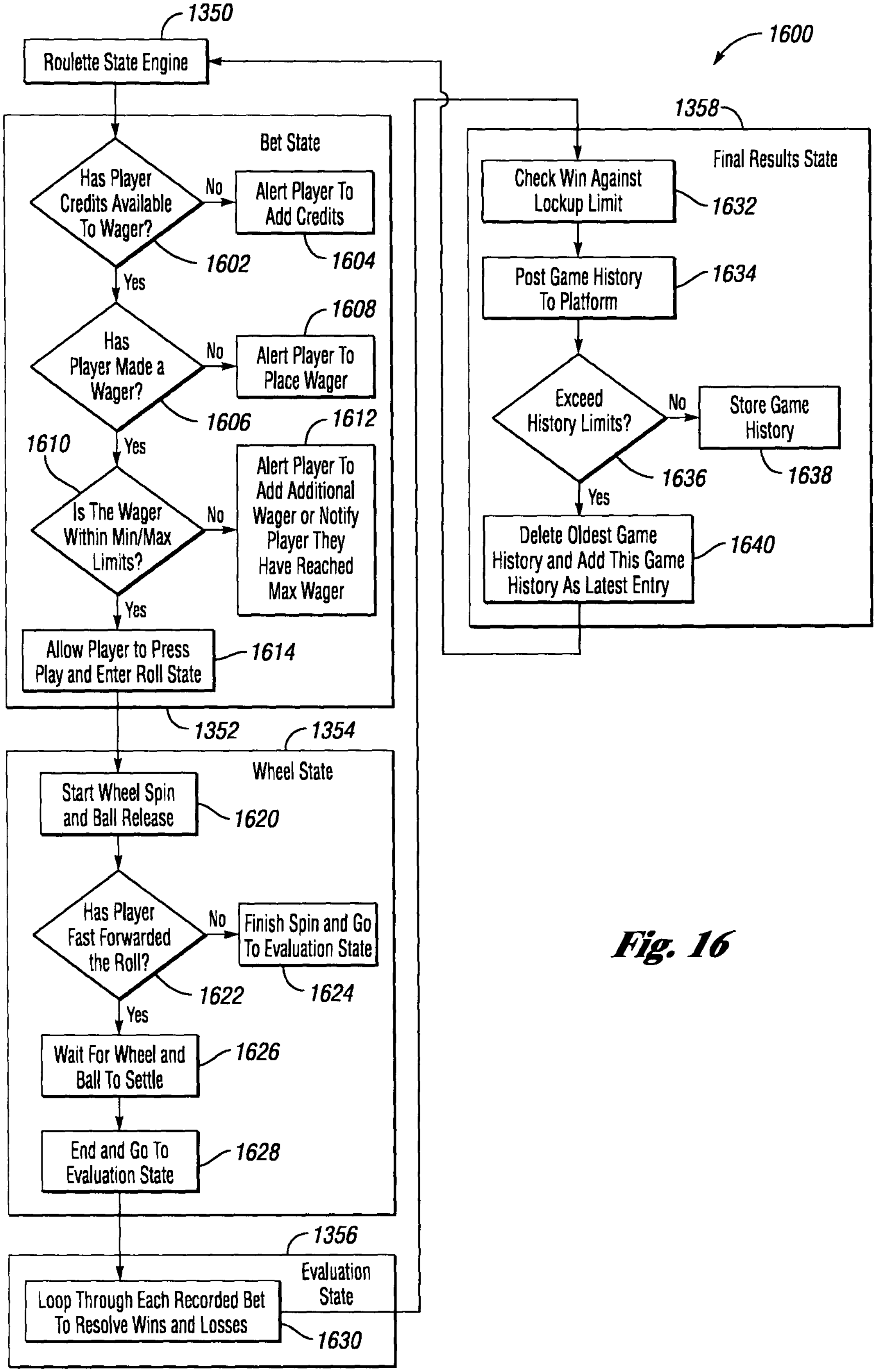
FIG. 16 illustrates an expanded block diagram of the roulette game engine of FIG. 13 for electronic table games of the present invention.

FIG. 16 illustrates an expanded block diagram 1600 of the roulette game engine of FIG. 13 for electronic table games according to the embodiments of the present invention. The roulette state engine 1350 is included within the complete roulette processing. Once a player has selected the game of roulette from the plurality of games offered, the game enters the bet state 1352 wherein the processor determines if the player has enough credits 1602 to meet the game's minimum bet or wager configuration. In the event credits are insufficient to meet the minimum bet or wager, the player is alerted 1604 to add credits to meet the minimum bet or wager configuration. If the player has sufficient credits to place a bet or wager, the player may continue the game and place a bet or wager. If the player does not place a bet or wager, as determined in decision block 1606, the player is alerted to place a bet or wager 1608. If the player has placed a bet or wager the processor determines if the bet or wager is within the minimum and maximum limits 1610. If the bet or wager is outside of the minimum and maximum limits, the player is notified to either add additional bet or wager or they have reached the games maximum limit 1612. If the bet or wager is within minimum and maximum limits 1610, the player is allowed to press the play button to start the game.

Once the player presses the play button, the game processing then enters the wheel state 1354 and begins with the spin the virtual roulette wheel and roulette ball. If the player has pressed the speed play button 1622, the virtual dice immediately come to rest at 1626. If not, the virtual dice simulate a dice roll and eventually come to a final resting position 1624. Once the simulated graphical dice roll comes to a final resting position, the processor instructs the game to go to the evaluation state 1628 and then enters the evaluation state 1356. Once entering the evaluation state 1356, the processor loops through each recorded bet or wager to resolve wins and losses 1630.

Once evaluation state 1356 concludes, the processor enters the final results state 1358. Initially, the processor checks win against lockup amount limit 1632. Thereafter, the game history is posted to the platform 1634 as is required in most gaming jurisdictions. Not every game ever played is required to reside in the game history. Instead, only a predetermined number of games or actions need be posted for a later recall to check the game history. As a limited number of games or actions need be recorded, a game history limit is established, e.g., last 25 games, last 50 games, last 100 games, etc. A determination is made if the current game history, when added to the previously posted games exceed the history limits 1636. If not, the game history is recorded and posted 1638. If the game history exceeds the limits, the oldest posted game or actions are deleted and the current posted game is added to the history as the most recent game or action 1640. At this point, the processor causes the entire process 1400 to begin again for the next game to be played.

Figure 17:
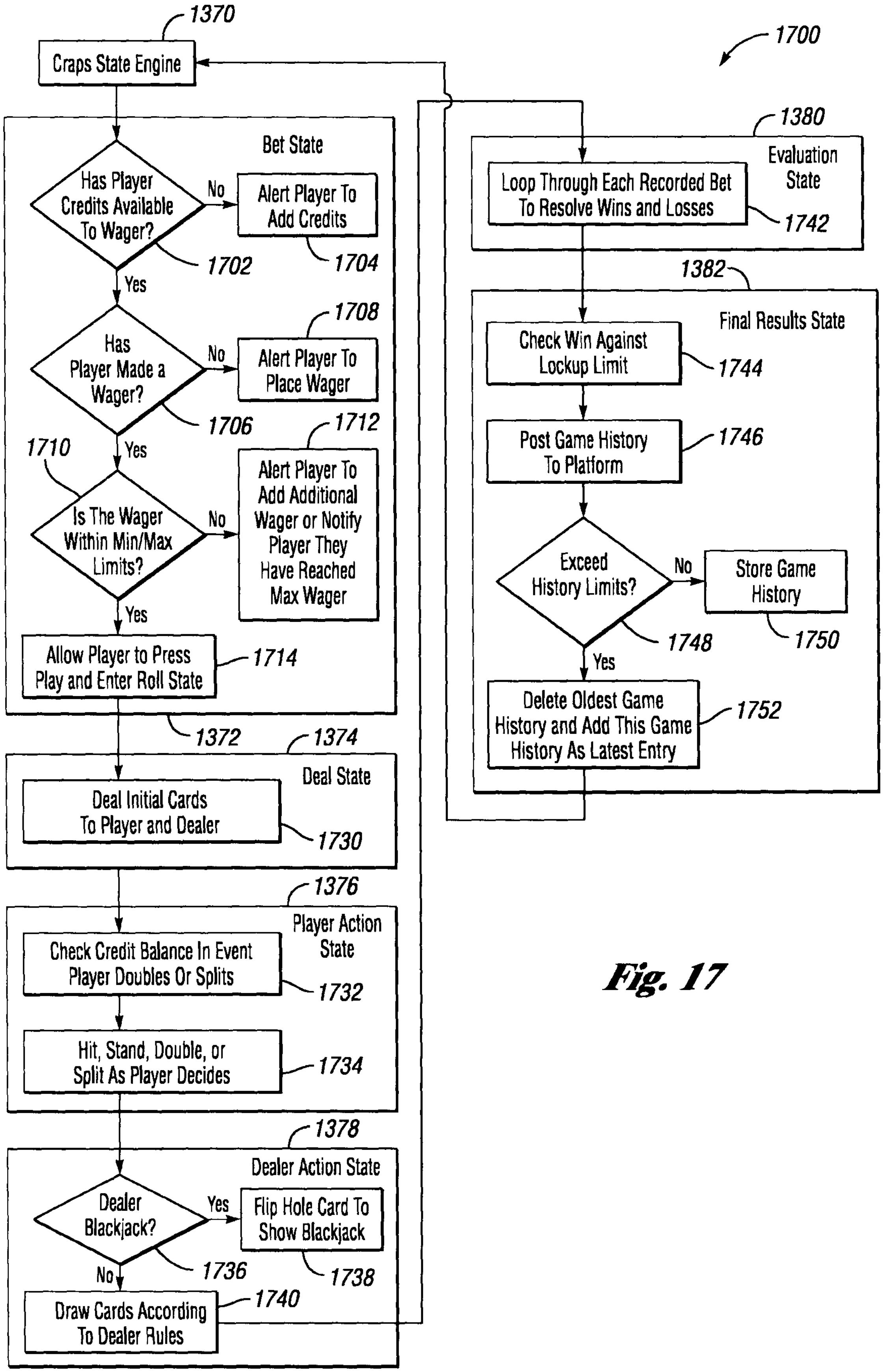
FIG. 17 illustrates an expanded block diagram of the blackjack game engine of FIG. 13 for electronic table games of the present invention.

FIG. 17 illustrates an expanded block diagram 1700 of the blackjack game engine of FIG. 13 for electronic table games according to the embodiments of the present invention. The blackjack state engine 1370 is included within the complete blackjack processing. Once a player has selected the game of blackjack from the plurality of games offered, the game enters the bet state 1372 wherein the processor determines if the player has enough credits 1702 to meet the game's minimum bet or wager configuration. In the event credits are insufficient to meet the minimum bet or wager, the player is alerted 1704 to add credits to meet the minimum bet or wager configuration. If the player has sufficient credits to place a bet or wager, the player may continue the game and place a bet or wager. If the player does not place a bet or wager, as determined in decision block 1706, the player is alerted to place a bet or wager 1708. If the player has placed a bet or wager the processor determines if the bet or wager is within the minimum and maximum limits 1710. If the bet or wager is outside of the minimum and maximum limits, the player is notified to either add additional bet or wager or they have reached the games maximum limit 1712. If the bet or wager is within minimum and maximum limits 1710, the player is allowed to press the play button to start the game 1714.

Once the player presses the play button, the game processing then enters the deal state 1374 and player and dealer cards are dealt 1730. Once the initial player and dealer cards are dealt, the game enters the player action state 1376 wherein the processor determines if the player has an adequate credit balance in the event the player doubles or splits their cards per game rules 1732 after which the player is allowed to continue play and either hit or receives one or more additional cards, stands on the two cards originally dealt, doubles their bet or wager per game rules or splits their original two cards if they match in value per game rules and play two separate hands as opposed to a single hand.

Once the player action state 1376 concludes, the processor enters the dealer action state 1378 wherein a determination is made as to whether the dealer's first two cards equal twenty-one 1736, known as a blackjack. If the dealer has a blackjack, the processor immediately reveals the dealer's hole card 1738 and the game concludes for any hand where the player does not also have a blackjack where the hand is considered a tie. If the dealer does not have a blackjack on their original two cards, play continues and the dealer draws cards according to the rules 1740. The game then enters the evaluation state 1380, the processor loops through each recorded bet or wager to resolve wins and losses 1742.

Once evaluation state 1380 concludes, the processor enters the final results state 1382. Initially, the processor checks win against lockup amount limit 1744. Thereafter, the game history is posted to the platform 1746 as is required in most gaming jurisdictions. Not every game ever played is required to reside in the game history. Instead, only a predetermined number of games or actions need be posted for a later recall to check the game history. As a limited number of games or actions need be recorded, a game history limit is established, e.g., last 25 games, last 50 games, last 100 games, etc. A determination is made if the current game history, when added to the previously posted games exceeds the history limits 1458. If not, the game history is recorded and posted 1750. If the game history exceeds the limits, the oldest posted game or actions are deleted and the current posted game is added to the history as the most recent game or action 1752. At this point, the processor causes the entire process 1700 to begin again for the next game to be played. Those skilled in the art will recognize that the same or similar sequence of events occur if the players has placed multiple bets or wagers. Although the embodiments of the present invention have been described in detail in the block diagrams of FIGS. 14 through 17, with reference to several embodiments, additional variations and modifications exist within the scope and spirit of the invention. Moreover, other than those illustrated, more or less steps or actions may be included or the sequencing may change within the scope and spirit of the invention.

Figure 18:
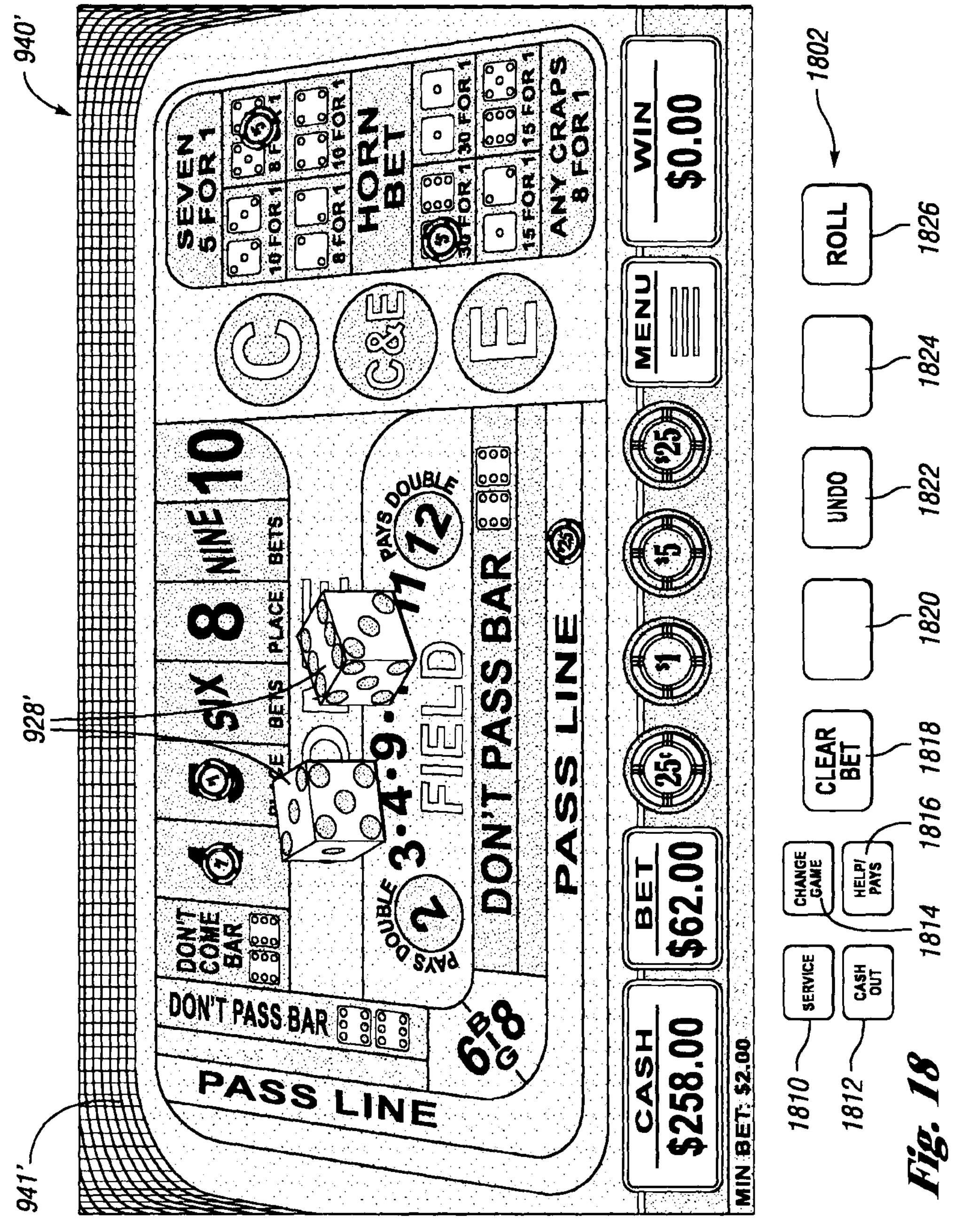
FIG. 18 illustrates a combined single display of the embodiment illustrated in FIG. 9 relating to the table game of craps according to the embodiments of the present invention.

FIG. 18 illustrates a combined single display of the embodiment illustrated in FIG. 9 relating to the table game of craps according to the embodiments of the present invention. All functionality, with the exception of the button panel and animated dice, as described in FIG. 9A through FIG. 9C, remains the same and need not be repeated here.

As illustrated, the button panel of FIG. 9A is incorporated into the embodiment illustrated in FIG. 18 by a combination of physical and programmable LCD buttons with only one game display. This display type is particularly well suited for single display EGMs such as bar-top EGMs or slant type EGMs. Those skilled in the art will recognize that any combination of physical or programmable LCD buttons may be utilized, including all physical buttons or all LCD buttons.

Although the button deck 1802 is utilized for the table game of craps, it may be utilized for other table games where appropriate. A number of common elements may exist between various table game user interfaces, some elements may be common between such user interfaces. Such common elements may include a service button 1810 used to alert the casino staff there may be a problem with the EGM, a collect button 1812 which allows a player to collect or cash out their current credits generally by way of a printed credit voucher, a change game button 1814 which allows a player to change games by toggling the display to the select screen shown in FIG. 8 or similar, and a help/pays button 1816 which provides the player with game rules, game information, paytable and the like. For the particular game of craps or similar games, a plurality of programmable LCD buttons are displayed which allow the player to clear a bet 1818, undo a previous operation 1822, or initiate the craps game by touching the roll button 1826. As illustrated, the programmable LCD buttons 1820 and 1824 are programmed to be blank and not used for the craps embodiment of the present invention. Alternatives, in any embodiment, include dimming the buttons, using different coloring, listing as "not used," etc.

After a player places their bets or wagers, the player touches the roll button 1826 to begin the roll portion of the craps game 940'. In the case of a single display as illustrated, the virtual dice 928' appear to roll on the craps game layout 941' as opposed to the upper display 920 as illustrated in FIG. 9B and the game is concluded with bets or wagers settled.

Figure 19:
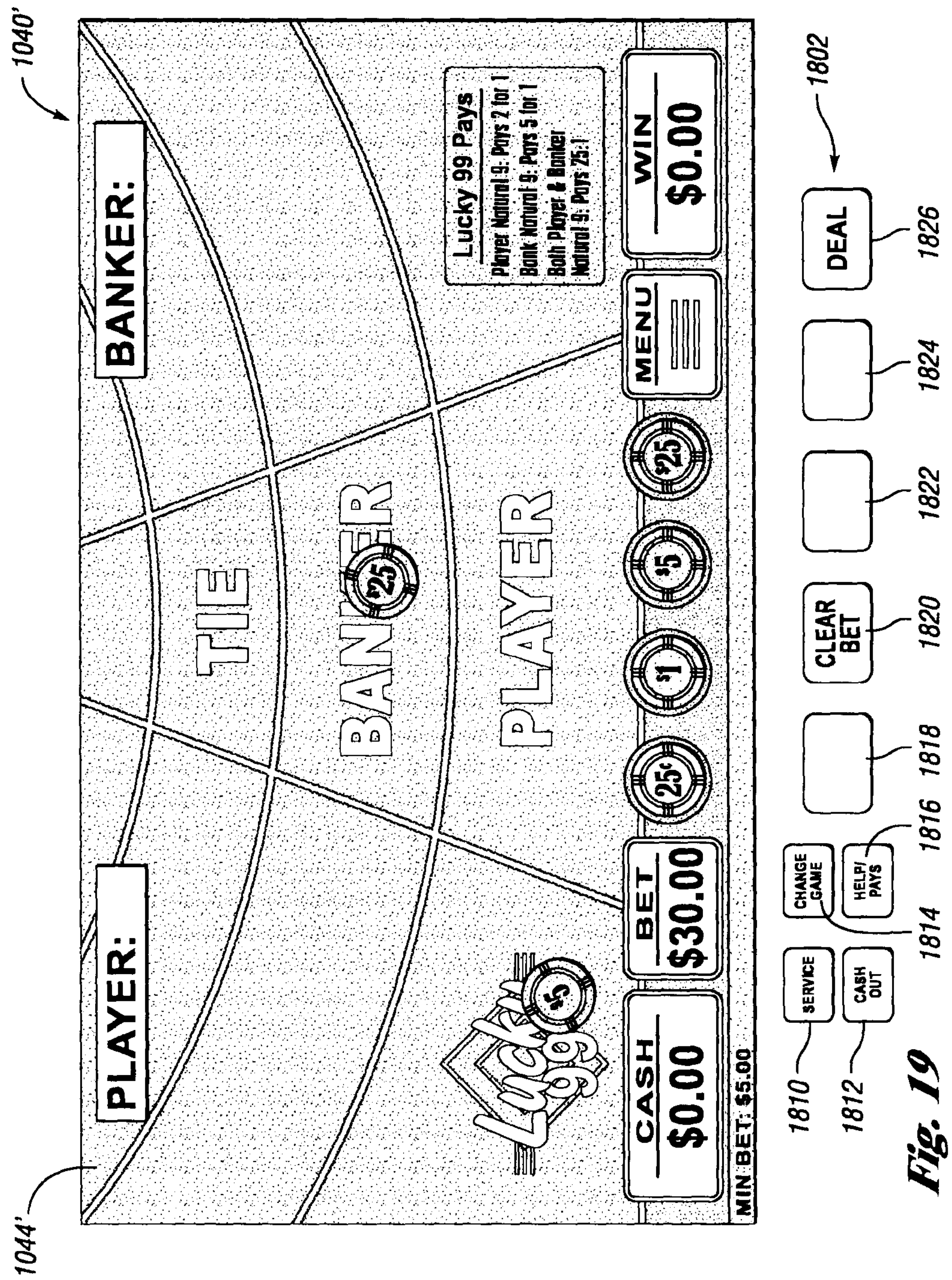
FIG. 19 illustrates a combined single display of the embodiment illustrated in FIG. 10 relating to the table game of baccarat according to the embodiments of the present invention.

FIG. 19 illustrates a combined single display of the embodiment illustrated in FIG. 10 relating to the table game of baccarat according to the embodiments of the present invention. All functionality, with the exception of the button panel, as described in FIG. 10A through FIG. 10C, remains the same and is not repeated here.

As illustrated, the button panel of FIG. 10A is incorporated into the embodiment illustrated in FIG. 19 by a combination of physical and programmable LCD buttons with only one game display. This display type is particularly well suited for single display EGMs such as bar-top EGMs or slant type EGMs. Those skilled in the art will recognize that any combination of physical or programmable LCD buttons may be utilized, including all physical buttons or all LCD buttons.

Although the button deck 1802 is utilized for the table game of baccarat, it may be utilized for other table games where appropriate. A number of common elements may exist between various table game user interfaces, some elements may be common between such user interfaces. Such common elements may include a service button 1810 used to alert the casino staff there may be a problem with the EGM, a collect button 1812 which allows a player to collect or cash out their current credits generally by way of a printed credit voucher, a change game button 1814 which allows a player to change games by toggling the display to the select screen shown in FIG. 8 or similar, and a help/pays button 1816 which provides the player with game rules, game information, paytable and the like. For the particular game of baccarat or similar games, a plurality of programmable LCD buttons are displayed which allow the player to clear a bet 1820 or initiate the craps game by touching the deal button 1826. As illustrated, the programmable LCD buttons 1818, 1822, and 1824 are programmed to be blank and not used for the baccarat embodiment of the present invention.

After a player places their bets or wagers on layout 1044', the player touches the deal button 1826 to begin the deal portion of the baccarat game 1040' and conclude the game with bets or wagers settled.

Figure 20:
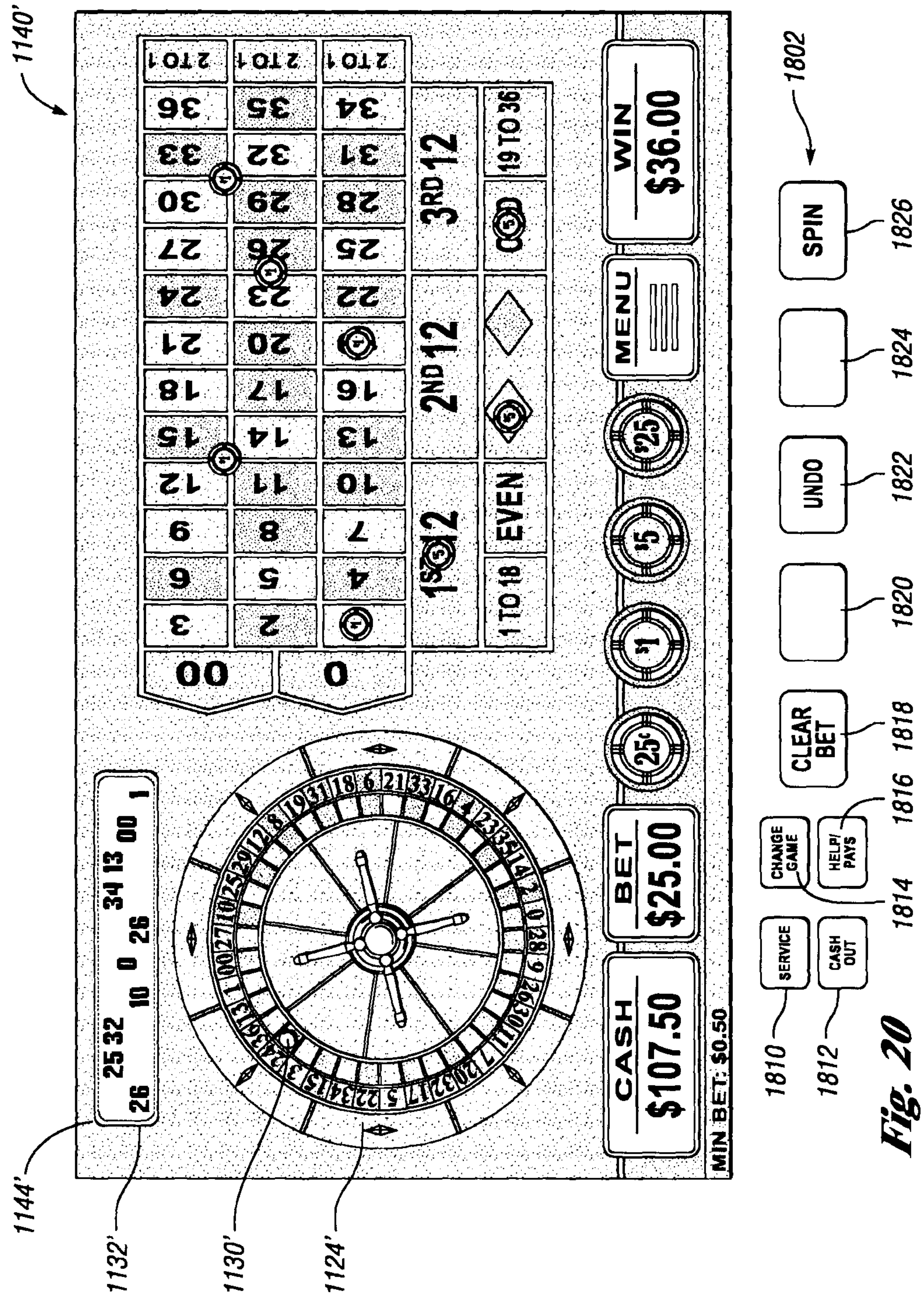
FIG. 20 illustrates a combined single display of the embodiment illustrated in FIG. 11 relating to the table game of roulette according to the embodiments of the present invention.

FIG. 20 illustrates a combined single display of the embodiment illustrated in FIG. 11 relating to the table game of roulette according to the embodiments of the present invention. All functionality, with the exception of the button panel and animated wheel and roulette ball, as described in FIGS. 11A through 11C, remains the same and need not be repeated here.

As illustrated, the button panel of FIG. 11A is incorporated into the embodiment illustrated in FIG. 20 by a combination of physical and programmable LCD buttons with only one game display. This display type is particularly well suited for single display EGMs such as bar-top EGMs or slant type EGMs. Those skilled in the art will recognize that any combination of physical or programmable LCD buttons may be utilized, including all physical buttons or all LCD buttons.

Although the button deck 1802 is utilized for the table game of roulette, it may be utilized for other table games where appropriate. A number of common elements may exist between various table game user interfaces, some elements may be common between such user interfaces. Such common elements may include a service button 1810 used to alert the casino staff there may be a problem with the EGM, a collect button 1812 which allows a player to collect or cash out their current credits generally by way of a printed credit voucher, a change game button 1814 which allows a player to change games by toggling the display to the select screen shown in FIG. 8 or similar, and a help/pays button 1816 which provides the player with game rules, game information, paytable and the like. For the particular game of roulette or similar games, a plurality of programmable LCD buttons are displayed which allows the player to clear a bet 1818, undo a previous operation 1822, or initiate the roulette game by touching the spin button 1826. As illustrated, the programmable LCD buttons 1820 and 1824 are programmed to be blank and not used for the roulette embodiment of the present invention.

After a player places their bets or wagers on layout 1144', the player touches the spin button 1826 to begin the spin portion of the roulette game 1140'. In the case of a single display as illustrated, the virtual wheel 1124' rotates or spins along with the spinning or bouncing of roulette ball 1130' until the virtual wheel 1124' comes to rest along with roulette ball 1130'. The game is concluded with bets or wagers settled. A history display 1132' maintains a record of the most recent game outcomes.

Figure 21:
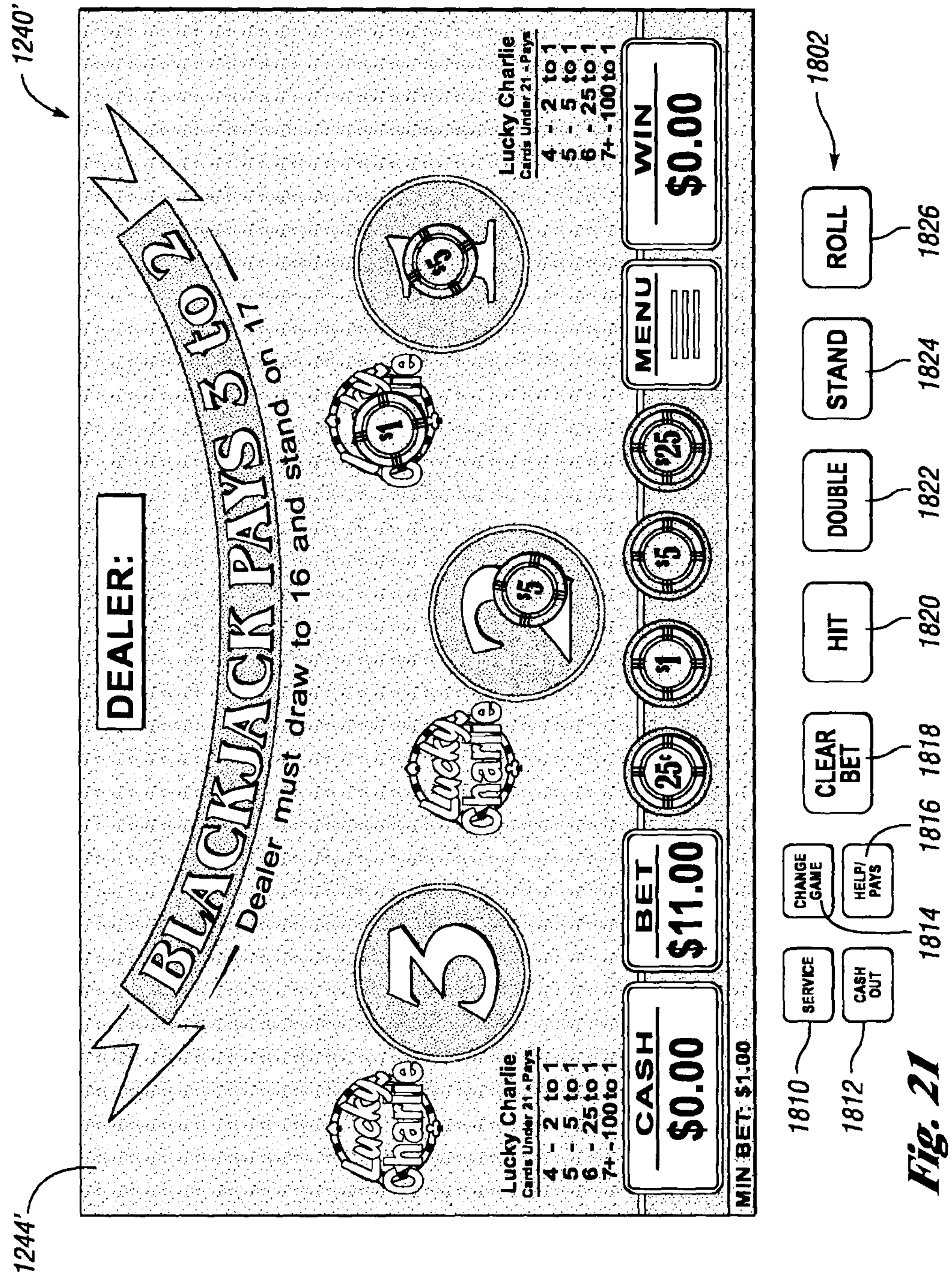
FIG. 21 illustrates a combined single display of the embodiment illustrated in FIG. 12 relating to the table game of blackjack according to the embodiments of the present invention.

FIG. 21 illustrates a combined single display of the embodiment illustrated in FIG. 12 relating to the table game of blackjack according to the embodiments of the present invention. All functionality, with the exception of the button panel, as described in FIGS. 12A through 12C, remains the same and need not be repeated here.

As illustrated, the button panel of FIG. 12A is incorporated into the embodiment illustrated in FIG. 21 by a combination of physical and programmable LCD buttons with only one game display. This display type is particularly well suited for single display EGMs such as bar-top EGMs or slant type EGMs. Those skilled in the art will recognize that any combination of physical or programmable LCD buttons may be utilized, including all physical buttons or all LCD buttons.

Although the button deck 1802 is utilized for the table game of blackjack, it may be utilized for other table games where appropriate. A number of common elements may exist between various table game user interfaces, some elements may be common between such user interfaces. Such common elements may include a service button 1810 used to alert the casino staff there may be a problem with the EGM, a collect button 1812 which allows a player to collect or cash out their current credits generally by way of a printed credit voucher, a change game button 1814 which allows a player to change games by toggling the display to the select screen shown in FIG. 8 or similar, and a help/pays button 1816 which provides the player with game rules, game information, paytable and the like. For the particular game of blackjack or similar games, a plurality of programmable LCD buttons are displayed which allow the player to clear a bet 1818, ask for an additional card or hit via button 1820, double their bet button 1822, stand via button 1824 or start or initiate the blackjack game by touching the deal button 1826. As illustrated, in this case and similar, there is no need for any of the programmable LCD buttons to be left blank. In the event the player receives identical value cards on the initial deal, one of the programmable LCD buttons displays a split message wherein the players may divide the hand into two separate hands and double their bet. Those skilled in the art will recognize that in any blackjack or similar game embodiment where additional hands are derived from an original hand, the player may be offered the choice of side bets related to the secondary hands.

After a player places his or her blackjack bets or wagers on layout 1244', the player touches the deal button 1826 to begin the deal portion of the blackjack game 1240' and after the player's and dealer's hands are concluded the game, the bets or wagers are settled.

In one embodiment, the EGM only offers table games. That is, the EGM does not offer non-table games such as video poker, keno, bingo, etc. In this manner, the EGM provides a teaching tool for players to experience how table games operate before venturing onto a physical, and possibly intimidating, casino table game. In one embodiment, the table game EGM may be positioned near the casino pit which accommodates the physical casino table games.

Although the invention has been described in detail with reference to several embodiments, additional variations and modifications exist within the scope and spirit of the invention as described and defined in the following claims.

We claim:

1. A gaming system comprising:

a monetary input device configured to receive a physical item associated with a monetary value;

a processor running executable instructions and associated memory;

one or more displays with at least a primary display area for playing virtual casino table games;

one or more user interfaces configured, along with the processor and associated memory, to allow a player to at least select a virtual casino table game to play from two or more stored virtual table games, place bets and start a hand or round of the selected virtual casino table game;

a plurality of game state engines corresponding to at least two or more stored virtual casino table games including at least two table games from a group of table games consisting of craps, baccarat, roulette, blackjack, three-card poker, pai gow poker, Caribbean stud and big 6 wheel, wherein a sequence of play for each virtual casino table game is controlled by a dedicated one of the plurality of game state engines;

wherein the processor is configured to allow the player to adjust speed of play associated with the virtual casino table games and wherein the processor truncates game animation associated with stored virtual table games when played to adjust the play speed;

wherein for at least the games of roulette and craps, an upper display is used to depict at least a portion of game play while a lower display area is used to depict at least a portion of a digital betting game layout for at least one of the table games; and wherein at least one side bet is offered to the player with at least one side bet having a higher hold percentage than the associated virtual casino table game.

2. The gaming system of claim 1 wherein at least one of the at least one side bets increases the average hold percentage of the associated virtual casino table game when played.

3. The gaming system of claim 1 wherein at least one of the at least one side bets has a payout which is a multiple of the associated virtual casino table game side bet wager.

4. The gaming system of claim 1 wherein at least one of the at least one side bets has a payout which is based on a progressive value of the associated virtual casino table game side bet.

5. The gaming system of claim 4 wherein the seed amount of the progressive value is greater than the side bet wager amount.

6. The gaming system of claim 1 wherein at least one of the plurality of side bets increases the average overall hold percentage of the gaming system when played.

7. The gaming system of claim 6 wherein the increase of the average overall hold percentage is based at least in part on a progressive virtual casino table game side bet when played.

8. The gaming system of claim 1 further comprising two user interfaces in the form of a touch screen primary display and a button deck comprising a programmable LCD screen.

9. The gaming system of claim 8 wherein the programmable LCD screen is configured to depict a different arrangement of potential inputs corresponding to each of the two or more stored virtual casino table games.

10. The gaming system of claim 1 further comprising a selectable chip denomination module whereby an operator may select denominations of virtual betting chips depicted on the primary display.

11. The gaming system of claim 1 wherein only virtual casino table games are stored.

12. The gaming system of claim 1 wherein each game state engine includes a math model associated with the corresponding stored virtual table game.

13. The gaming system of claim 1 wherein an upper display area and a lower display area are located on two or more displays.

14. The gaming system of claim 13 wherein an upper display area and a lower display area are located on two or more displays with the displays positioned in a landscape orientation.

15. The gaming system of claim 1 wherein an upper display area and a lower display area are located on a single display.

16. The gaming system of claim 15 wherein the single display is positioned in a portrait orientation.

17. A gaming system comprising:

a monetary input device configured to receive a physical item associated with a monetary value;

a processor and associated memory;

one or more displays with at least a primary display area for playing virtual casino table games;

one or more user interfaces configured, along with the processor and associated memory, to allow a player to at least select a virtual casino table game to play from two or more stored virtual table games, place bets and start a hand or round of the selected virtual casino table game;

a plurality of game state engines corresponding to at least two or more stored virtual casino table games including at least two table games from a group of table games consisting of craps, baccarat, roulette, blackjack, three-card poker, pai gow poker, Caribbean stud and big 6 wheel, wherein a sequence of play for each virtual casino table game is controlled by a dedicated one of the plurality of game state engines;

wherein the processor is configured to allow the player to adjust speed of play associated with the virtual casino table games;

wherein an upper display area is used to depict at least a portion of game play while a lower display area is used to depict at least a portion of a digital betting game layout for at least one of the table games; and wherein at least side bet is offered to the player with at least one side bet having a higher hold percentage than the associated virtual casino table game.

18. The gaming system of claim 17 wherein at least one of the at least one side bets increases the average hold percentage of the associated virtual casino table game when played.

19. The gaming system of claim 17 wherein at least one of the at least one side bets has a payout which is a multiple of the associated virtual casino table game side bet wager.

20. The gaming system of claim 17 wherein at least one of the at least one side bets has a payout which is based on a progressive value of the associated virtual casino table game side bet.

21. The gaming system of claim 20 wherein the seed amount of the progressive value is greater than the side bet wager amount.

22. The gaming system of claim 17 wherein the at least one side bet offered to the player increases the average overall hold percentage of the gaming system when played.

23. The gaming system of claim 22 wherein the increase of the average overall hold percentage is based at least in part on a progressive virtual casino table game side bet when played.

24. The gaming system of claim 17 further comprising two user interfaces in the form of a touch screen primary display and a button deck comprising a programmable LCD screen.

25. The gaming system of claim 24 wherein the programmable LCD screen is configured to depict a different arrangement of potential inputs corresponding to each of the two or more stored virtual casino table games.

26. The gaming system of claim 17 further comprising a selectable chip denomination module whereby an operator may select denominations of virtual betting chips depicted on the primary display.

27. The gaming system of claim 17 wherein only virtual casino table games are stored.

28. The gaming system of claim 17 wherein each game state engine includes a math model associated with the corresponding stored virtual table game.

29. The gaming system of claim 17 wherein an upper display area and a lower display area are located on two or more displays.

30. The gaming system of claim 29 wherein an upper display area and a lower display area are located on two or more displays with the displays positioned in a landscape orientation.

31. The gaming system of claim 17 wherein an upper display area and a lower display area are located on a single display.

32. The gaming system of claim 31 wherein the single display is positioned in a portrait orientation.

33. A gaming system comprising:

a monetary input device configured to receive a physical item associated with a monetary value;

a processor and associated memory;

one or more displays with at least a primary display area for playing virtual casino table games;

one or more user interfaces configured, along with the processor and associated memory, to allow a player to at least select a virtual casino table game to play from two or more stored virtual table games, place bets and start a hand or round of the selected virtual casino table game;

a plurality of game state engines corresponding to at least two or more stored virtual casino table games including at least two table games from a group of table games consisting of craps, baccarat, roulette, blackjack, three-card poker, pai gow poker, Caribbean stud and big 6 wheel, wherein a sequence of play for each virtual casino table game is controlled by a dedicated one of the plurality of game state engines;

wherein an upper display area is used to depict at least a portion of game play while a lower display area is used to depict at least a portion of a digital betting game layout for at least one of the table games; and wherein at least one side bet is offered to the player with at least one side bet having a higher hold percentage than the associated virtual casino table game.

34. The gaming system of claim 33 wherein at least one of the at least one side bets increases the average hold percentage of the associated virtual casino table game when played.

35. The gaming system of claim 33 wherein at least one of the at least one side bets has a payout which is a multiple of the associated virtual casino table game side bet wager.

36. The gaming system of claim 33 wherein at least one of the at least one side bets has a payout which is based on a progressive value of the associated virtual casino table game side bet.

37. The gaming system of claim 36 wherein the seed amount of the progressive value is greater than the side bet wager amount.

38. The gaming system of claim 33 wherein the at least one side bet increases the average overall hold percentage of the gaming system when played.

39. The gaming system of claim 38 wherein the increase of the average overall hold percentage is based at least in part on a progressive virtual casino table game side bet when played.

40. The gaming system of claim 33 further comprising two user interfaces in the form of a touch screen primary display and a button deck comprising a programmable LCD screen.

41. The gaming system of claim 40 wherein the programmable LCD screen is configured to depict a different arrangement of potential inputs corresponding to each of the two or more stored virtual casino table games.

42. The gaming system of claim 33 further comprising a selectable chip denomination module whereby an operator may select denominations of virtual betting chips depicted on the primary display.

43. The gaming system of claim 33 wherein only virtual casino table games are stored.

44. The gaming system of claim 33 wherein each game state engine includes a math model associated with the corresponding stored virtual table game.

45. The gaming system of claim 33 wherein an upper display area and a lower display area are located on two or more displays.

46. The gaming system of claim 45 wherein an upper display area and a lower display area are located on two or more displays with the displays positioned in a landscape orientation.

47. The gaming system of claim 33 wherein an upper display area and a lower display area are located on a single display.

48. The gaming system of claim 47 wherein the single display is positioned in a portrait orientation.

49. A gaming method comprising:

configuring a monetary input device to receive a physical item associated with a monetary value;

configuring at least one processor running executable instructions to operate a game of chance on a gaming machine including one or more displays and memory in communication with the at least one processor, the one or more displays having at least a primary display area for playing virtual casino table games;

configuring one or more user interfaces, along with the processor and associated memory, to allow a player to at least select a virtual casino table game to play from two or more stored virtual table games, place bets and start a hand or round of the selected virtual casino table game;

further configuring the processor running executable instructions to utilize a plurality of game state engines corresponding to at least two or more stored virtual casino table games including at least two table games from a group of table games consisting of craps, baccarat, roulette, blackjack, three-card poker, pai gow poker, Caribbean stud and big 6 wheel, wherein a sequence of play for each virtual casino table game is controlled by a dedicated one of the plurality of game state engines;

further configuring the processor running executable instructions to allow the player to adjust speed of play associated with the virtual casino table games and wherein the processor truncates game animation associated with stored virtual table games when played to adjust the play speed;

utilizing an upper display area to depict at least a portion of game play while a lower display area is used to depict at least a portion of a digital betting game layout for at least one of the table games;

offering at least one side bet to the player with at least one side bet having a higher hold percentage than the associated virtual casino table game; and enabling the player to select a wager for a game of chance and enabling the player to initiate a cash out operation.

50. The gaming method of claim 49 wherein at least one of the at least one side bets increases the average hold percentage of the associated virtual casino table game when played.

51. The gaming method of claim 49 wherein at least one of the at least one side bets has a payout which is a multiple of the associated virtual casino table game side bet wager.

52. The gaming method of claim 49 wherein at least one of the at least one side bets is based on a progressive value of the associated virtual casino table game side bet.

53. The gaming method of claim 52 wherein the seed amount of the progressive value is greater than the side bet wager amount.

54. The gaming method of claim 49 wherein at least one side bet offered to the player increases the average overall hold percentage of the gaming system when played.

55. The gaming method of claim 54 wherein the increase of the average overall hold percentage is based at least in part on a progressive virtual casino table game side bet when played.

56. The gaming method of claim 49 further comprising two user interfaces in the form of a touch screen primary display and a button deck comprising a programmable LCD screen.

57. The gaming method of claim 56 wherein the programmable LCD screen is configured to depict a different arrangement of potential inputs corresponding to each of the two or more stored virtual casino table games.

58. The gaming method of claim 49 further comprising a selectable chip denomination module whereby an operator may select denominations of virtual betting chips depicted on the primary display.

59. The gaming method of claim 49 wherein only virtual casino table games are stored.

60. The gaming method of claim 49 wherein each game state engine amongst the plurality of game state engines includes a math model associated with the corresponding stored virtual table game.

61. The gaming method of claim 49 wherein an upper display area and a lower display area are located on two or more displays.

62. The gaming method of claim 61 wherein an upper display area and a lower display area are located on two or more displays with the displays positioned in a landscape orientation.

63. The gaming method of claim 49 wherein an upper display area and a lower display area are located on a single display.

64. The gaming method of claim 63 wherein the single display is positioned in a portrait orientation.

65. A gaming method comprising:

utilizing a monetary input device configured to receive a physical item associated with a monetary value;

enabling a player to select a wager for a game of chance and enabling the player to initiate a cash out operation;

configuring at least one processor running executable instructions to operate a game of chance on a gaming machine including one or more displays and memory in communication with the at least one processor, the one or more displays having at least a primary display area for playing virtual casino table games;

configuring one or more user interfaces, along with the processor and associated memory, to allow a player to at least select a virtual casino table game to play from two or more stored virtual table games, place bets and start a hand or round of the selected virtual casino table game;

configuring the processor running executable instructions to utilize a plurality of game state engines corresponding to at least two or more stored virtual casino table games including at least two table games from a group of table games consisting of craps, baccarat, roulette, blackjack, three-card poker, pai gow poker, Caribbean stud and big 6 wheel, wherein a sequence of play for each virtual casino table game is controlled by a dedicated one of the plurality of game state engines;

further configuring the processor running executable instructions to allow the player to adjust speed of play associated with the virtual casino table games;

utilizing an upper display area to depict at least a portion of game play while a lower display area is used to depict at least a portion of a digital betting game layout for at least one of the table games; and offering at least one side bet to the player with at least one side bet having a higher hold percentage than the associated virtual casino table game.

66. The gaming method of claim 65 wherein at least one of the at least one side bets increases the average hold percentage of the associated virtual casino table game when played.

67. The gaming method of claim 65 wherein at least one of the at least one side bets has a payout which is a multiple of the associated virtual casino table game side bet wager.

68. The gaming method of claim 65 wherein at least one of the at least one side bets has a payout which is based on a progressive value of the virtual casino table game side bet.

69. The gaming method of claim 68 wherein the seed amount of the progressive value is greater than the side bet wager amount.

70. The gaming method of claim 65 wherein the at least one side bet increases the average overall hold percentage of the gaming system when played.

71. The gaming method of claim 70 wherein the increase of the average overall hold percentage is based at least in part on a progressive virtual casino table game side bet when played.

72. The gaming method of claim 65 further comprising two user interfaces in the form of a touch screen primary display and a button deck comprising a programmable LCD screen.

73. The gaming method of claim 72 wherein the programmable LCD screen is configured to depict a different arrangement of potential inputs corresponding to each of the two or more stored virtual casino table games.

74. The gaming method of claim 65 further comprising a selectable chip denomination module whereby an operator may select denominations of virtual betting chips depicted on the primary display.

75. The gaming method of claim 65 wherein only virtual casino table games are stored.

76. The gaming method of claim 65 wherein each game state engine includes a math model associated with the corresponding stored virtual table game.

77. The gaming method of claim 65 wherein an upper display area and a lower display area are located on two or more displays.

78. The gaming method of claim 77 wherein an upper display area and a lower display area are located on two or more displays with the displays positioned in a landscape orientation.

79. The gaming method of claim 65 wherein an upper display area and a lower display area are located on a single display.

80. The gaming method of claim 79 wherein the single display is positioned in a portrait orientation.

81. A gaming method comprising:

utilizing a monetary input device configured to receive a physical item associated with a monetary value;

enabling a player to select a wager for a game of chance and enabling the player to initiate a cash out operation;

configuring at least one processor running executable instructions to operate a game of chance on a gaming machine including one or more displays and memory in communication with the at least one processor;

utilizing one or more displays with at least a primary display area for playing virtual casino table games;

configuring one or more user interfaces configured, along with the processor and associated memory, to allow a player to at least select a virtual casino table game to play from two or more stored virtual table games, place bets and start a hand or round of the selected virtual casino table game;

configuring the processor running executable instructions to utilize a plurality of game state engines corresponding to at least two or more stored virtual casino table games including at least two table games from a group of table games consisting of craps, baccarat, roulette, blackjack, three-card poker, pai gow poker, Caribbean stud and big 6 wheel, wherein a sequence of play for each virtual casino table game is controlled by a dedicated one of the plurality of game state engines;

utilizing an upper display area to depict at least a portion of game play while a lower display area is used to depict at least a portion of a digital betting game layout for at least one of the table games; and offering at least one side bet to the player with at least one side bet having a higher hold percentage than the associated virtual casino table game.

82. The gaming method of claim 81 wherein at least one of the at least one side bets increases the average hold percentage of the associated virtual casino table game when played.

83. The gaming method of claim 81 wherein at least one of the at least one side bets has a payout which is a multiple of the associated virtual casino table game side bet wager.

84. The gaming method of claim 81 wherein at least one of the at least one side bets has a payout which is based on a progressive value of the associated virtual casino table game side bet.

85. The gaming method of claim 84 wherein the seed amount of the progressive value is greater than the side bet wager amount.

86. The gaming method of claim 81 wherein the plurality of side bets increase the average overall hold percentage of the gaming system when played.

87. The gaming method of claim 86 wherein the increase of the average overall hold percentage is based at least in part on a progressive virtual casino table game side bet when played.

88. The gaming method of claim 81 further comprising two user interfaces in the form of a touch screen primary display and a button deck comprising a programmable LCD screen.

89. The gaming method of claim 88 wherein the programmable LCD screen is configured to depict a different arrangement of potential inputs corresponding to each of the two or more stored virtual casino table games.

90. The gaming method of claim 81 further comprising a selectable chip denomination module whereby an operator may select denominations of virtual betting chips depicted on the primary display.

91. The gaming method of claim 81 wherein only virtual casino table games are stored.

92. The gaming method of claim 81 wherein each game state engine includes a math model associated with the corresponding stored virtual table game.

93. The gaming method of claim 81 wherein an upper display area and a lower display area are located on two or more displays.

94. The gaming method of claim 93 wherein an upper display area and a lower display area are located on two or more displays with the displays positioned in a landscape orientation.

95. The gaming method of claim 81 wherein an upper display area and a lower display area are located on a single display.

96. The gaming method of claim 95 wherein the single display is positioned in a portrait orientation.

* * * * *